United States Patent
Roy

(10) Patent No.: US 10,430,598 B2
(45) Date of Patent: Oct. 1, 2019

(54) SECURE GENERALIZED BLOOM FILTER

(71) Applicant: The Government of the United States, as represented by the Secretary of the Army, Washington, DC (US)

(72) Inventor: Radhika Roy, Howell, NJ (US)

(73) Assignee: The Government of the United States, as represented by the Secretary of the Army, Washington, DC (US)

( * ) Notice: Subject to any disclaimer, the term of this patent is extended or adjusted under 35 U.S.C. 154(b) by 293 days.

(21) Appl. No.: 15/617,161

(22) Filed: Jun. 8, 2017

(65) Prior Publication Data

US 2018/0357434 A1    Dec. 13, 2018

(51) Int. Cl.
| | |
|---|---|
| *G06F 21/00* | (2013.01) |
| *G06F 21/62* | (2013.01) |
| *H04L 9/06* | (2006.01) |
| *H04L 9/32* | (2006.01) |

(52) U.S. Cl.
CPC ........ *G06F 21/6209* (2013.01); *H04L 9/0643* (2013.01); *H04L 9/3218* (2013.01)

(58) Field of Classification Search
None
See application file for complete search history.

(56) References Cited

U.S. PATENT DOCUMENTS

| | | | | |
|---|---|---|---|---|
| 7,702,640 | B1 * | 4/2010 | Vermeulen | G06F 16/2246 707/999.1 |
| 2013/0010950 | A1 * | 1/2013 | Kerschbaum | H04L 9/008 380/30 |
| 2014/0108435 | A1 * | 4/2014 | Kolesnikov | G06F 7/24 707/754 |
| 2016/0092699 | A1 * | 3/2016 | Riva | H04L 67/306 726/26 |
| 2017/0070492 | A1 * | 3/2017 | Rubin | G06F 16/22 |
| 2018/0268135 | A1 * | 9/2018 | Nachenberg | G06F 21/552 |

\* cited by examiner

*Primary Examiner* — Shin-Hon (Eric) Chen
(74) *Attorney, Agent, or Firm* — Ronald Krosky; Azza Jayaprakash

(57) ABSTRACT

Various embodiments are described that relate to a generalized Bloom filter design methodology. The Bloom filter design methodology can be used for preventing Bloom filter-specific cyber-attacks instead of designing special-purpose Bloom filters that can be applied preventing a specific kind of attack for a given kind of communications networking environment. The resultant security functionalities that can be considered as a package for the generalized secure Bloom filter can include Identifier Modifications, Secure Indexes, Dynamic Salting, Independent Multiple Hash Functions, Random Bit Insertions, Fake Bit Injections, Secure Record Linkage, Single Bloom Filter with all Identifiers, and Encryption. The overall secure generalized Bloom filter algorithms can be devised along with numerous sub-algorithms for these functionalities for making the Bloom-filter-based communications over a network providing robust security, reliability, and availability, preventing known cyber-attacks.

20 Claims, 15 Drawing Sheets

SECURE GENERALIZED BLOOM FILTER

GOVERNMENT INTEREST

The innovation described herein may be manufactured, used, imported, sold, and licensed by or for the Government of the United States of America without the payment of any royalty thereon or therefor.

BACKGROUND

In a communications environment, various information can be transferred from one location to another. If this information is valuable, then the environment can be subjected to cyber-attacks. It can therefore be desirable to stop such cyber-attacks.

SUMMARY

In one embodiment, a system comprises a production component and an access component. The production component can be configured to produce a secure Bloom filter implemented with a security feature. The access component can be configured to allow access to the secure Bloom filter.

In another embodiment, a non-transitory computer-readable medium can be configured to store computer-executable instructions that when executed by a processor cause the processor to perform a method. The method can comprise identifying a request to create a secure Bloom filter. The method can also comprise creating the secure Bloom filter through implementation of a security method. The security method can comprise compressing an identifier of a Bloom filter, integrating the Bloom filter with multiple identifiers using a long-term clock, and encrypting the Bloom filter. The security method can also comprise creating secure indexing of the Bloom filter, a random salt dynamically for the Bloom filter, multiple independent hash functions for the Bloom filter, and a linkage for the Bloom filter. The security method can additionally comprise inserting a random bit into the Bloom filter and inserting a fake bit into the Bloom filter.

In yet another embodiment, a method can comprise receiving an encrypted Bloom filter set that has been transmitted and decrypting the encrypted Bloom filter set to produce a decrypted Bloom filter set. The method also comprises computing a similarity coefficient for the decrypted Bloom filter set and comparing the similarity coefficient against a threshold. The method additionally comprises accepting the decrypted Bloom filter set if the similarity coefficient meets the threshold and finalizing the Bloom filter set in response to accepting the Bloom filter.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

In one embodiment, a Bloom filter can be employed. The Bloom filter can comprise one or more security features and these security features can protect the contents of the Bloom filter. These security features can help protect the Bloom filter.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs including separate applications or code from dynamically linked libraries.

Figure 1:
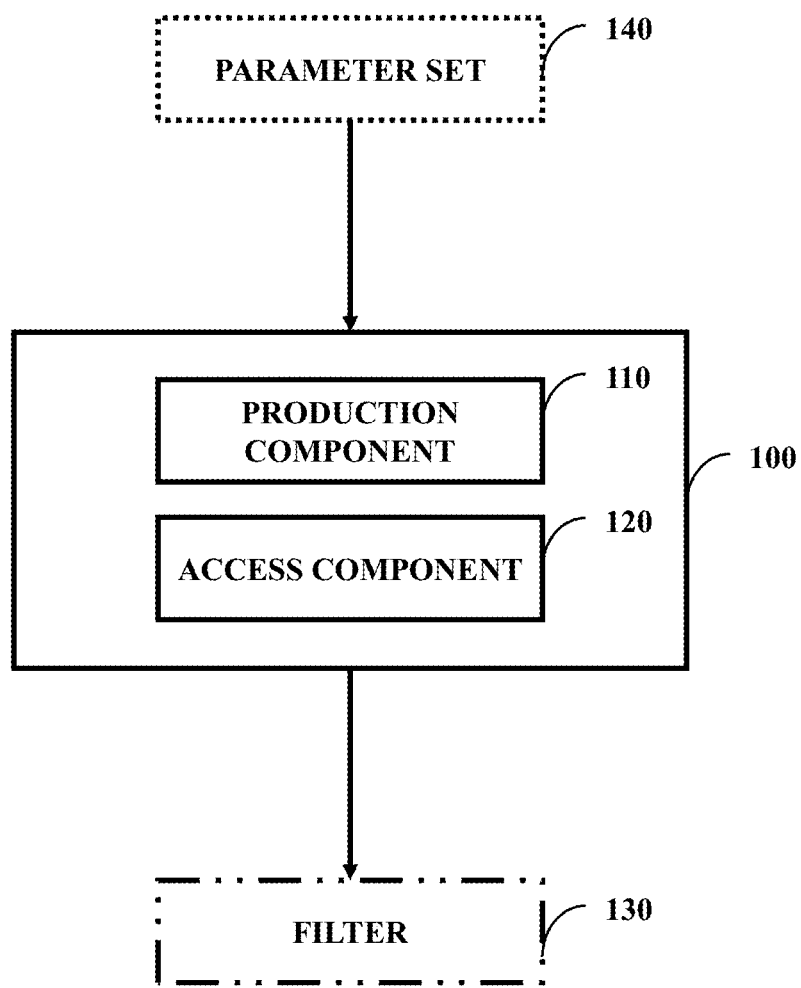
FIG. 1 illustrates one embodiment of a system comprising a production component and an access component.

FIG. 1 illustrates one embodiment of a system comprising a production component 110 and an access component 120. The production component 110 can be configured to produce a filter 130 (e.g., a secure Bloom filter) implemented with a security feature. This filter can be produced, in one example, from a parameter set 140. The access component 120 can be configured to allow access to the filter 130 (e.g., cause the filter 130 to be available for use). In one embodiment, the access component 120 is a transmitter.

Information sharing and data processing (e.g. signature-based antivirus files, caches, audit logs, database queries, accumulated hash schemes, database servers, routers, security, and packet forwarding) using Bloom filters (BFs) can be used in preserving bandwidth in centralized and distributed networking systems (e.g., for commercial arenas and/or tactical arenas). The hashing nature of Bloom filters provides some basic security features in the sense that the identities of set elements represented by the BF are not clearly visible for an observer. However, standard or basic BFs, as opposed to a secure BF, can be vulnerable to many cyber-attacks finding correlation where the similarity of BFs' contents can be deduced by comparing BF indexes for overlaps, or lack thereof. The standard or basic BFs can allow some leak of information such as an approximate total number of elements inserted. Moreover, dictionary attacks can be launched with probabilistic arguments for the presence of elements in a given BF if the applications leak the hash functions.

A generalized Bloom filter design methodology can be used (e.g., employed by the production component 110) that can be used for preventing many of the Bloom filter-specific cyber-attacks instead of designing special-purpose Bloom filters that can be applied preventing a specific kind of attacks for a given kind of communications networking environment. Although this is a generalized BF design methodology, it can preserve the fundamental objectives such as bandwidth preserving capabilities and thereby reducing network costs despite some increase in complexities for preventing host BF-specific cyber-attacks at the cost of some minor increase in overhead traffic and processing cost. The resultant security functionalities that can be considered as a package for the generalized secure BF are as follows: Identifier Modifications, Secure Indexes, Dynamic Salting, Independent Multiple Hash Functions, Random Bit Insertions, Fake Bit Injections, Secure Record Linkage, Single Bloom Filter with all Identifiers, and Encryption. The overall secure generalized Bloom filter algorithms can be devised along with numerous sub-algorithms for these functionalities. This can make Bloom-filter-based communications over the networks experience robust security, reliability, and availability preventing known cyber-attacks.

A Bloom filter can offer a space-efficient probabilistic data structure that can represent a set that can result in false positives (e.g., but not false negatives). The probability of false positives can be reduced by choosing appropriate number of hash functions, file size (e.g., number of bits), and/or number of elements inserted in the filter. Generally, a hash function maps a key universe $\mathcal{U}$ of keys into some range of $k \in \mathcal{K}$ of hash values. However, storing a truly random hash function can require total bit numbers that become unrealistic. In general, the keys can originate from a very large universe $\mathcal{U}$. However, interest is limited in the performance on an unknown set $\mathcal{S} \subseteq \mathcal{U}$ of up to n element/object keys.

In fact, a Bloom filter can be an array of m bits for representing a set $\mathcal{S}$ of n element/object keys of $\{x_i, i=1, n\}$ from a large universe $\mathcal{U}$ that includes an array of m bits, initially all set to 0.

$$\mathcal{S} = \{x_1, x_2, \ldots, x_n\}, x \in \mathcal{S} \quad (1)$$

In the beginning, bits in the filter can be set to zero. One can use k hash functions, $\{h_i(x), 1 \le i \le k, k \in n\}$ to map items $x \in \mathcal{S}$ to random numbers uniform in the bit range $1, \ldots, m$. The MD5 and HMAC algorithm are popularly used for hashing. An element $x \in \mathcal{S}$ is inserted into the filter by setting the bits $h_i(x)$ to one for $1 \le i \le k$. Conversely, if y is assumed a member of $\mathcal{S}$ and the bits $h_i(y)$ are set, and guaranteed not to be a member if any bit $h_i(y)$ is not set.

One can formulate the Bloom filter as follows: Bloom filter b consists of m bits and $b_j (1 \le j \le m)$ for $j^{th}$ bit of Bloom filter b.

Bloom filters support the operations add (x) for addition of element x to the set and test(x) to test for inclusion of element x.

Create(m): m Bits $(1 \le i \le m)$ are set to 0

$$\forall j \cdot b_j = 0$$

And k hash functions, $\{h_i(x), 1 \le i \le k, k \in n\}$ are published:

$$\forall j \cdot h_j: \{0,1\}^* \rightarrow \{1, \ldots, m\}$$

Add(x): The element x is hashed with all k hash functions $h_i$ and the k bits at the resulting indices $l_i$ are set to 1:

$$\forall i \cdot l_i = h_i(x) \bigwedge b_{l_i} = 1$$

Test(x): Again, the element x is hashed with all k hash functions $h_i$ and if all k bits at the resulting indices $l_i$ are set, then the test function returns true:

$$\bigvee_{i=1}^{k} b_{h_i(x)}$$

Algorithms can be used for object/element key insertion such as x (inserting in bits) in the Bloom filter and for testing whether an object such as x (examining the bits) resides within the Bloom filter. Although the possibility of a false positive is the price that is being paid for reducing the bandwidth, false positives are elements that are not part of S but are reported being in the set by the filter.

The following can be example performance parameters of a basic Bloom filter:
  m=Number of bits in the Bloom filter;
  k=Number of hash functions, $k \in n$; and
  n=Number of element/object keys (or elements/objects) inserted in the Bloom filter.

When inserting one element/object into the Bloom filter, the probability that a certain bit is not set to one by a single hash function is provided as follows:

$$\left(1 - \frac{1}{m}\right) \quad (2)$$

If there are k number of hash functions, the probability of any of them not having set a specific bit to one is given by:

$$\left(1-\frac{1}{m}\right)^k \quad (3)$$

After inserting n elements to the Bloom filter, the probability that a given bit is zero is:

$$\left(1-\frac{1}{m}\right)^{kn} \quad (4)$$

Consequently, the probability that the bit is one is given by:

$$\left[1-\left(1-\frac{1}{m}\right)^{kn}\right] \quad (5)$$

To determine whether an element belongs to the Bloom filter, the membership test can be performed. If about all of the k array positions in the filter computed by the hash functions are set to one within the Bloom filter, then the element can be classified as belonging to the set. However, the probability of this happening when the element is not part of the set, which is termed as the false positive rate (FPR), is provided by:

$$\left[1-\left(1-\frac{1}{m}\right)^{kn}\right]^k \approx (1-e^{-kn/m})^k \quad (6)$$

Note that $e^{-kn/m} \approx (1-1/m)^{kn}$. The FPR probability, which indicates an element is present in the set by the membership test while actually the element is not a part of the set, can be represented by $(1-e^{-kn/m})^k$. FPR decreases with the increase in filter size m. The FPR probability increases with n as more elements/objects are added.

To minimize the FPR $(1-e^{-kn/m})^k$ with respect to k, differentiation can occur with k being set to zero for finding the optimal value of k. After differentiation with respect to k, a preferred (e.g., optimal) value of k is provided as follows:

$$k_{opt} = \frac{m}{n}\ln 2 \approx \frac{9}{13}\frac{m}{n} \quad (7)$$

With the result being manipulated as:

$$\left(\frac{1}{2}\right)^k \approx 0.6185^{m/n} \quad (8)$$

FPR probability can be bounded using the preferred number of hashes $k_{opt}$ as:

$$\frac{m}{n} \geq \frac{1}{\ln 2} \quad (9)$$

Equation (9) shows that, if there is a desire to keep a given FPR probability bounded within a fixed value, the length of the Bloom filter should grow linearly with the number of elements/objects inserted in the Bloom filter. Additionally, the number of bits (and in turn Bloom filter size) m for the desired number of elements n and FPR probability assuming as p, is given by:

$$m = -\frac{n\ln p}{(\ln 2)^2} \quad (10)$$

For a given number of hashes k, if the ratio between the Bloom filter size m and number of elements inserted n is kept the same, that is, if $$\left(\frac{n}{m}\right)$$

remains me same, the FPR probability also remains the same.

In terms of bit-error-rate (BER), the equation can be re-written as follows:

$$P_{BER} \approx \left(1-e^{-\frac{kn}{m}}\right)^k = \left(1-e^{-\frac{k}{m/n}}\right)^k \quad (11)$$

The number of bits/element/key/object/entry is provided by:

$$\frac{m}{n} = \frac{-k}{\ln\left[1-e^{\frac{\ln(P_{BER})}{k}}\right]} \quad (122)$$

Certain identifiers like surnames, given names, date of birth, and address information that are used for searching information using Bloom filters are known as the vital personal identity information and distribution of files containing such information may be legally restricted in some countries. So, a protocol for privacy-preserving record linkage with encrypted identifiers allowing for errors in identifiers using Bloom filters can make the implementation more secured.

In Privacy-Preserving Record Linkage Bloom Filter Implementations (a protocol), two data custodians A and B (or more) can first agree upon a password. Then the custodians can standardize the identifiers, pad them with blanks at the beginning and the end, and split them into substrings of q number of characters, called q-grams (for example, for q=2, it is called di-grams or 2-grams). In one example, q=2. An individual bigram of an identifier is mapped through multiple password-dependent hash functions (keyed-hash message authentication codes (HMACs), such as keyed MD5 or SHA-1) to a Bloom filter. The probability of a false positive can be computed (e.g., without a false negative). The similarity of two Bloom filters can be computed in order to understand how successfully the recovery can be made for Bloom filter-based implementations despite the fact that cryptographic implementation introduces some errors.

By computing the similarity of two Bloom filters (e.g., individual groupings of two filters), such as by evaluation of the number of coincident bit positions that are set to 1, the similarity of the encoded identifiers can be approximated via a similarity metric. Hence, through calculation of the similarity between two encrypted records, record linkage based on Bloom filters allows for errors in the encrypted data. Because an individual identifier is handled with a separate Bloom filter, record linkage software can be used if a function for computing similarities of binary vectors is available. If two surnames have many q-grams in common, their Bloom filters will have a large number of identical bit positions set to 1. The proportion of zeros in a Bloom filter for n elements with q-grams is approximately given by:

$$\psi = \left(1 - \frac{1}{m}\right)^{kn} \quad (13)$$

A long Bloom filter can contain mostly zeros. To assess the similarity of Bloom filters, a coefficient insensitive to many matching zeros can be desirable. Therefore the Dice-coefficient that measures the similarity can be chosen. For comparing bit strings, the Dice-coefficient can be defined as:

$$\mathcal{D}_{A,B} = \frac{2w}{(a+b)} = 2 * \frac{|A \cap B|}{|A| + |B|} \quad (14)$$

where w is the number of bit positions set to 1 in both A & B bit strings, a is the number of bit positions set to 1 in A and b the number of bit positions set to 1 in B.

Similarly, the Jacard-coefficient that measures the similarity can be chosen. For comparing bit strings, the Jacard-coefficient can be defined as:

$$\mathcal{J}_{A,B} = \frac{w}{(a+b)-w} = \frac{|A \cap B|}{|A| + |B| - |A \cap B|} \quad (15)$$

where w is the number of bit positions set to 1 in both bit strings, a is the number of bit positions set to 1 in A and b the number of bit positions set to 1 in B.

Similarly, the Cosine-coefficient that measures the similarity is chosen. For comparing bit strings, the Cosine-coefficient can be defined as:

$$C_{A,B} = \frac{w}{(\sqrt{a} \cdot \sqrt{b})} = \frac{|A \cap B|}{\sqrt{|A|} \cdot \sqrt{|B|}} \quad (16)$$

where w is the number of bit positions set to 1 in both bit strings, a is the number of bit positions set to 1 in A and b the number of bit positions set to 1 in B.

For example, for different queries using the initial keywords "Anna, Hazare, Anti, Corruption," the results obtained for similarity coefficients shown in Table 1 can be:

TABLE 1

| Best Fitness Values for Different Queries | | | |
|---|---|---|---|
| Query | Jacard | Dice | Cosine |
| Anna, Hazare, Anti, Corruption | 0.245556 | 0.392462 | 0.498964 |

The similarity coefficient is often compared with a given threshold that is determined by the performance objective of a given application. If it is found that the similarity coefficient value is greater than the threshold, the Bloom filter sets accepted are considered a match on the information (e.g. last name).

Performance of aspects disclosed herein can be compared with the performance of the q-gram similarity between unencrypted surnames using simulated and actual databases. For a given level of similarity, a pair of records can be considered as a match if the pair is actually a true pair, with other pairs being called non-matches. Based on classification for true positive (TP), false positive (FP), false negative (FN) and true negative (TN) pairs, and the comparison criteria can be defined as:

$$\text{recall} = \frac{\sum TP}{\sum TP + \sum FN} \quad (17)$$

$$\text{precision} = \frac{\sum TP}{\sum TP + \sum FP} \quad (18)$$

Plotting precision and recall for different similarity values as a curve in a precision-recall-plot can show the performance of a string comparison method.

Multiple benefits can be derived from using an encrypted Bloom filter over a non-encrypted Bloom filter. The performance gain of the encrypted Bloom filters can increase with the use of more hash functions compared to those of the unencrypted trigrams (3-grams) for example. Additionally, the precision recall performance for the encrypted Bloom filters can also be better than that of the exact string method. Further, precision recall performance of the secure Bloom filter method is quite comparable to that of the unencrypted trigrams methods for example. Also, precision recall performance of the Bloom filter method is superior to the German phonetic encoding especially at recall levels above 0.75. This is mainly due to the large number of false positives produced by the phonetic encoding.

Crypto-analytic attacks can be successfully mounted with a very high probability even against encrypted privacy-preserving Bloom filters. This crypto-analytic attack uses considerably less computational effort. In view of this, a successful crypto-analytic attack can be launched even against the encrypted Bloom filters. As discussed, the unencrypted BFs are more vulnerable to many cyber-attacks for leakage of information such as deducing the similarity of a BF's contents by comparing BF indices for overlap, or lack thereof. Therefore, a secure BF—not just an encrypted BF—should be used. The secure Bloom filter can incorporate aspects of the encrypted Bloom filter, but goes beyond mere encryption for security.

A framework for secure Bloom filter (e.g., secure generalized Bloom filter) described herein can provide robust protection against the cyber-attacks described earlier. Theoretically, many of the security features can be broken by attackers if they have unlimited amount of processing power for launching attacks within the given small time window that is offered by modern communications systems. However, the goal of the framework can be to raise the cost to attackers sufficiently high such that basic Bloom filters cannot offer despite their hashing capabilities. Different security features can be used to prevent the cyber-attacks in compositing the BF-based applications as appropriate. This can be implemented, at least in part, by way of security algorithms containing the disclosed functionality.

Figure 2:
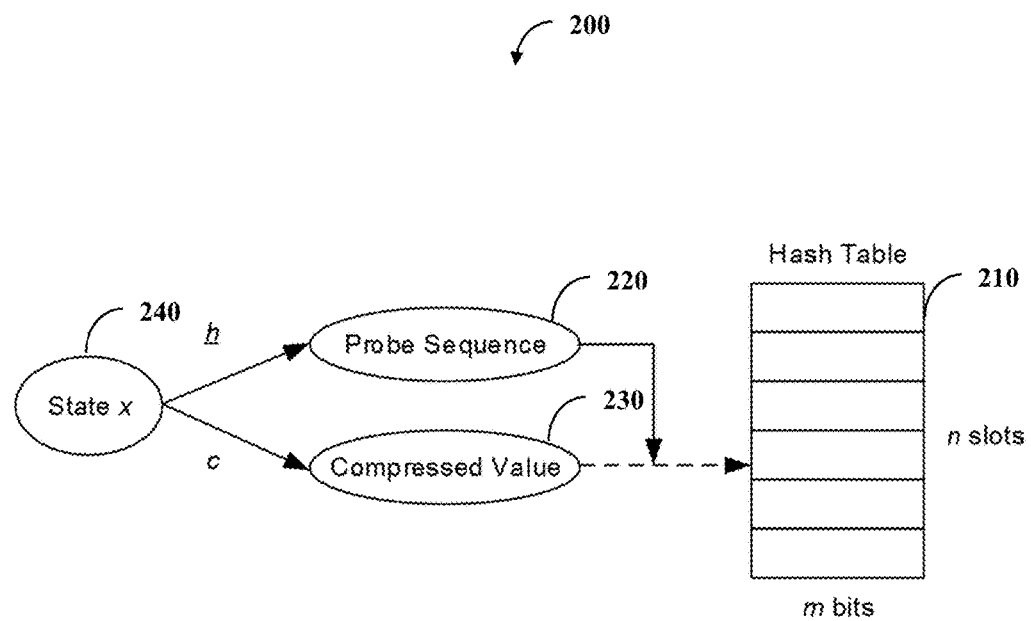
FIG. 2 illustrates one embodiment of a system comprising a hash table, a probe sequence, a compressed value, and a state.

FIG. 2 illustrates one embodiment of a system 200 comprising a hash table 210, a probe sequence 220, a compressed value 230, and a state 240. One option for secure Bloom filters is modification of the identifiers in the hash table 210, such as deletion or sampling of bigrams for long names. Shortening the identifiers can prevent the identification of longer names. On the one hand, the bigram frequencies would change, so that applying this attack would imply that the attacker knows the deletion or sampling scheme to assign candidate atoms to bigrams appropriately. On the other hand, it would be much more difficult for an adversary to guess the names from the remaining or sampled bigrams. Furthermore, omitting the padding of bigrams makes the identification of starting and ending letters much harder, because an attacker cannot differentiate between bigrams from the center and the beginning or the end of a name.

This can be accomplished, in one example, by using hashing of the long names for shortening the identities and then re-hashing the resulting value for obtaining original long names. In hash compact of the longer identifiers, a compression function c can be used to obtain the compressed value $c(x) \in \{1, \ldots, 1\}$ to be stored in the table for each of the states. Here, l denotes the number of possible compressed values, $l=2^b$. Then, the probability that two different states have the same compressed value is bounded by $Pr(c(x_1)=c(x_2)) \leq 1/l$, for all $x_1, x_2 \in X$, $s_1 \neq x_2$, where X denotes the set of about all possible states and $s_1 \in S$ is already an existing stored state in c. This bound is achieved by choosing a function at random from a universal class of hash functions at the start of the verifier, thereby defeating possible adversaries. A consequence of this bound is that the omission probability can also be bounded.

An improvement of the basic algorithm can take place to avoid the collision of states that are stored in the hash table 210. A collision of states occurs if two states hash the same slot in the hash table. A vectorial hash function $\bar{h}$ can be applied to individual states x yielding a probe sequence $\{h_1(x_1), h_2(x_2), \ldots, h_n(x_n)\}$ where n denotes the number of slots in the hash table 210 and $h_i(x_i)$ in index in the hash table 210.

When inserting slots in the table, the slots can be tested in emptiness according to the probe sequence 220. The compact state c(s) can stored in the in the first empty slot found during the probe sequence 220. Note that an individual probe sequence 220 can be a permutation of $\{1, \ldots, n\}$ if slots in the table to be used. A probabilistic method can be used to make the computation much more efficient.

An enhanced algorithm can reduce the average number of probes used in unsuccessful searches introducing the ordered hashing. Below is an example ordered hash table insertion algorithm:

```
Insert(sate x)
begin
    i: = h'(x);
    v:= c(x);
    while not (T[i] is empty or T[i] < v) do        // search
        if T[i] = v then return 'state already present';
        i := [i + h"(v)] mod n;
    end
    while not (T[i]is non - empty) do // insertion
        if T[i] <= v then interchange the values of T[i] ↔ v;
        i := [i + h"(v)] mod n;
    end
    T[i] = v;
    return 'state inserted';
end
```

Here, T[i] denotes the $i^{th}$ slot in the hash table (i=1, . . . , m) and also the value in this slot and h' and h" are two functions which are used to calculate the probe sequence 220. The hash function h" can yield values that are relatively prime to n for the algorithm to properly function. Typically n is chosen to be prime and h" yields values between 1 to n−1. Since h" is applied to c(x), there is some dependency between compressed value and the probe sequence 220 of a state 240, which is taken into account in the analysis of this scheme.

In case of making queries to retrieve documents from databases, the Bloom filter-based queries can be used for saving bandwidth and secure indexing can be used for providing data security. A secure index can be a data structure that allows a query with a "trapdoor" for a word w to test in constant O(1) time per document (e.g., only if the index contains x); the index reveals no information about its contents without valid trapdoors, and trapdoors can be generated with a secret key (e.g., only generated with a secret key). It also guarantees privacy such as those provided by oblivious and history independent data structures and formulates a security model for indexes known as semantic security against adaptive chosen keyword attack (IND-CKA). These secure techniques can also be used to build Bloom filter-based encrypted searchable audit logs, private database query schemes, accumulated hashing schemes, secure set membership tests and other purposes.

| | |
|---|---|
| Keygen(s): | Given a security parameter (e.g. a password) s, outputs the master private key $K_{priv}$ which, in turn, consists of a set of r keys:<br>$K_{priv} = (k_1, \ldots, k_r)$<br>For example, a specific implementation of this might be a 512-bit hash (maybe using SHA-512) of the input password to create the master private key, $K_{priv}$, which is then split into sixteen 4-byte keys (r = 16). |
| Trapdoor $(K_{priv}, w)$: | Given the master key $K_{priv}$ and a given word w, outputs the trapdoor $T_w$ for a given word w.<br>A trapdoor is a transformation of the term being searched for such that an untrusted server can find potential matches, without gaining knowledge of the plaintext. In this secure index scheme, a trapdoor is formed of a given input word w, the private key $K_{priv}$ and a series of hash functions. This algorithm is described as Trapdoor($K_{priv}$, w) and given the necessary arguments, the trapdoor $T_w$ is computed (where f is a suitable hash algorithm) as follows:<br>$T_w = \{f_{k_1}(w), \ldots, f_{k_r}(w)\}$<br>Note: w is a given specific word of a given document D. |
| BuildIndex $(D, K_{priv})$: | Given a document D and the master key $K_{priv}$, outputs the index $I_D$ |
| SearchIndex $(T_w, I_D)$: | Given the trapdoor $T_w$ for word w and the index $I_D$ for document D, outputs 1 if $w \in D$ and 0 otherwise |

The encryption process can center on generation of the index. BuildIndex(D, $K_{priv}$) that takes the private key and a document, D that includes the plaintext and a unique identifier, $D_{id}$ and returns a Bloom filter representing the document index. The document identifier $D_{id}$ is used to stop two identical documents from generating the same index (or documents containing a large number of repeated words from generating similar indexes). The client, given a document and the private key can then create the document's index as discussed below.

Initially, the document can be split into a set of words, say $\{w_i, i=1, \ldots, q\}$. Note that punctuation can be ignored (e.g., unless a prediction is made that a user is likely to want to search for it in our particular application). This is thanks to the fact that the entire, unmodified document is encrypted and uploaded to the server, whilst the index can merely contain words that the user is likely to search on.

For an individual word, $w_i$ the following algorithm is then performed:
1. A trapdoor is constructed from the word $w_i$ and the private key $K_{priv}$ using the Trapdoor($K_{priv}$, $w_i$) algorithm.

$$T_{w_i} = \{f_{k_1}(w_i), \ldots, f_{k_r}(w_i)\} \quad (19)$$

2. A code-word is then constructed based on the trapdoor $T_{w_i}$. This takes individual elements of $T_{w_i}$ and hashes them with the document ID.

$$C_{w_i} = f_{id}(T_{w_i}) = \{f_{id}[f_{k_1}(w_i)], \ldots, f_{id}[f_{k_r}(w_i)]\} \quad (20)$$

3. This code-word can now be added to the Bloom filter that represents the document index.

The index created through this action can now be used as the document index. However, the Bloom filter can be blinded with random noise in order to further discourage potential statistical analysis.

The blinding procedure can start by calculating u as the number of tokens (e.g., one byte per token as a reasonable estimate) in the encrypted version of the document's plaintext. This can be calculated as the length of the plaintext, plus any appropriate padding. Then v is calculated as the number of unique words in the document. Once this is done, $(u-v)*r$ bits are inserted at random into the Bloom filter (where r is the same as was used in the Keygen(s) algorithm, and hence the number of tokens in the code-word $C_{w_i}$).

Once the Bloom filter has been blinded, it can be returned by the BuildIndex(D, $K_{priv}$) algorithm as the index $\mathcal{I}_{D_{id}}$ for the document D. Once the index is constructed, the plaintext document is encrypted using a standard block cipher and the private key $K_{priv}$ which is denoted as $E_{K_{priv}}(D)$. The tuple containing this encrypted document, the document identifier $D_{id}$ and the index can then be uploaded to the untrusted server.

$$\text{Ciphertext} = \langle D_{id}, \mathcal{I}_{D_{id}}, E_{K_{priv}}(D) \rangle \quad (21)$$

When the user wants to perform a search for word $w_i$, the trapdoor $T_{w_i}$ for the search term is generated using the Trapdoor($K_{priv}$, $w_i$) algorithm. Once this is generated, it can be handed to the untrusted server which can then iterate over its stored documents and perform the following:

1. Generate the code-word from the trapdoor in the same manner as previously.
2. The document's Bloom filter index is then checked to see if this code-word is a member.
3. If the Bloom filter replies positively, the document is added to the set of documents to return to the user.

The trapdoor can be used to hide the search term from the server, whilst the second-stage code-word is used to cleanly separate indexes of documents with similar content.

The Bloom filter is capable of returning false positives. Because of this, the document set returned to the client should not be taken for granted—an individual document returned should be able to be decrypted and manually searched client-side. This has the benefit of obfuscating the actual result set from the server, which would see more documents than necessary returned by a query, therefore reducing the amount of information available to it for cryptanalysis.

Salting describes the process of generating hash values that depend on a record-specific key. In record linkage scenarios, short identifiers such as date or year of birth are natural candidates for such a key. Then, for a single bigram b appearing in two names, the same bit positions are set to 1 in the corresponding Bloom filters in the situation if the keys coincide. If the keys are not equal, it is unlikely that all hash values for the bigram b are the same. Thus, the keys should not contain too many errors so that the Bloom filters remain error tolerant.

Similar to the use of dynamic salt for authentication, random generation of the cryptographic salt for the Bloom filter can occur. The error detection of a codes with variable lengths (CVL) algorithm can be used for withstanding against leakage of information of Bloom filters adapting with generator polynomial dynamically. Its initialization (e.g. registration) phase can work as follows:

1. Calculates a generator polynomial specific to any regenerated random salt.
2. Calculates the cyclic redundancy code (CRC) of this random salt.
3. Stores the secure random salt as being the concatenation of random salt and its CRC.

Its identification phase can work as follows:
1. Checks random salt safe integrity.
2. Deduces the random salt.

The binary string-based dynamic rotation (BSDR) algorithm can be applied in order to properly ensure that the cryptographic nature of short identifiers such as date or year of birth are regenerated. This ensures the unpredictability, and un-traceability of original short identifiers. With this, the phase:

1. Generates a binary sequence from the concatenation of the original password and a random salt.
2. Calculates the position of the dynamic rotation that is the sum of all bits of this binary sequence generated.
3. Directs the dynamic rotation by the parity of this calculated position.

In summary, the cryptographic features can contain the following:
The hash functions.
The symmetric cryptographic primitives.
The dynamic rotation of binary strings.
The CRC code of variable lengths.
Regeneration random salts $RS_i$ specific to each identifier of linkage $U_i$.

Individual identifiers can have the following four security parameters stored in the memory for verification:
Unique number $ID_i$ for each identifier of linkage.
Final secret key $SK_i$ after hashing for each identifier of linkage for a given session.
Regenerator of cryptographically secure random salts $CSRS_i$.
A positive random integer $N_i$ that corresponds to the sum of all bits of a primitive signal $RS_i$. Note that the binary representation of $N_i$ is the generator polynomial associated with each one-time salt $OTS_i$.

A double hashing scheme can be used that is based on k hash functions that reduces the false positive rate probability, although this may not be sufficient enough for preventing the cyber-attacks. These hash functions can be linear combinations of two cryptographic hash functions and do possess sufficient Hamming weight for preventing cryptographic attacks. On the other end of the spectrum, the computation of fully independent multiple hash functions in the design of randomized algorithms and data structures can be extremely costly in terms of computation time, processing power, and memory requirements and may not be realistic in practice.

A Bloom filter that uses multiple independent hash functions that map keys may originate from a very large universe $\mathcal{U}$ of items, with individuals in range $\mathcal{R}$ of hash values. In general, the keys can originate from a very large universe $\mathcal{U}$ of keys into some range $\mathcal{R}$ of hash values. In one example, a random hash function h is a random variable from $\mathcal{R}^{\mathcal{U}}$, assigning a random hash value $h(x) \in \mathcal{R}$ to about every element/object $x \in \mathcal{U}$. A truly random hash function is picked uniformly from $\mathcal{R}^{\mathcal{U}}$, assigning a uniform and independent hash value $h(x) \in \mathcal{R}$ to each key $x \in \mathcal{U}$. Often randomized algorithms are analyzed assuming access to truly random hash functions. However, just storing a truly random hash function may require $|\mathcal{U}|\log_2|\mathcal{R}|$ bits, which can be unrealistic for large key universes.

In general, the keys may originate from a very large universe $\mathcal{U}$. However, often interest is limited in the performance on an unknown set $S \subseteq \mathcal{U}$ of up to n keys. Then our first step is to do a universe reduction, mapping $\mathcal{U}$ randomly to "signatures" in [u]={1, 2, ..., u}, where u=$n^{O(1)}$ for example, u=$n^3$ so that no two keys from S are expected to get the same signature. It can be assumed that this universe reduction has been done, if needed, hence there can be a limit to keys from the polynomial universe [u].

The concept of k-independence can mean that a hash function can be thought of as h: [u]→[q] as a random variable distributed over $[q]^{[u]}$. Hash function h can be k-independent if (a) for about any distinct element/object keys $\{x_1, x_2, \ldots, x_n\} \in [u]$, the hash values $\{h(x_1), h(x_2), \ldots, h(x_n)\}$ are independent random variables; and (b) for any fixed x, h(x) is uniformly distributed in [q].

A Bloom filter can be devised that uses k fully random hash functions on some universe $\mathcal{U}$ of items, with range {1, 2, ..., p} for a prime p. The hash table 210 can include m=kp bits; with individual hash functions assigned a disjoint subarray of p bits in the filter that can be treated as numbered {1, 2, ..., p}. This can help provide efficient constructions of hash functions that for randomized algorithms yield probabilistic guarantees similar to those obtained assuming fully random hashing.

In this context, multiple independent hash functions can be used that are comparatively easy to implement in practice and sufficiently robust enough for preventing cyber-attacks for Bloom filters, such as in ascending order of robustness and complexity (e.g., Simple Tabulation Hashing, Twisted Tabulation Hashing, or Double Tabulation Hashing).

Simple Tabulation Hashing can deal with hash values that are m-bit numbers. A goal can be to hash element/object keys from $S$ into the range of $2^m$. In tabulation hashing, a key $x \in S$ is interpreted as a vector of n>1 "element/object keys" from $x=\{x_1, x_2, \ldots, x_n\} \in S$. For "simple tabulation hashing" independent random element/object key tables can be initialized for individual positions $x_1, x_2, \ldots, x_n$ of $\{h_1(x_1), h_2(x_2), \ldots, h_n(x)\}$. The hash h(x) of an element/object key $x=\{x_1, x_2, \ldots, x_n\}$ can be computed as:

$$h(x) = \left\{ \bigoplus_{i \in n} [h_i(x_i)] \right\} = \{h_1[x_1] \oplus h_2[x_2] \oplus \ldots, \oplus h_n[x_n]\} \quad (22)$$

Here $\oplus$ denotes bit-wise exclusive-or. It can be seen that element/object keys are viewed as including n numbers with precomputed element/object key tables of $\{h_1(x_1), h_2(x_2), \ldots, h_n(x_n)\}$ mapping elements/objects to random hash values. An element/object key $x=\{x_2, \ldots, x_n\}$ is hashed to $\{h_1[x_1]|h_2[x_2] \oplus \ldots, \oplus h_n[x_n]\}$. This scheme is very fast with character tables in cache. While simple tabulation is not even 4-independent, it does provide many of the guarantees that are normally obtained via higher independence, for example linear probing and Cuckoo hashing. One can use simple tabulation hashing for Bloom filters as one of the methods that is simple to compute as well as to prevent attacks providing the benefits for multiple independent hash functions.

The simple tabulation hashing can have much more power than suggested by its 3-independence. However, there are also some weaknesses. The simple tabulation is fine as long as the subset (say, l) of prime p is large (note: p>>l). If l is small such as l=2, the error probability can increase to a level that may not be acceptable for many applications. This problem can be solved by twisted tabulation hashing. It adds a quick twist to simple tabulation, leading to more general distributional properties that work for small l as well as for large l. For a sequence [{i=2, 3, ..., n}, n<l] one can expand the entries of $h_i$ with a random number (e.g., a random bit or a random character as appropriate) called the "twister." More precisely, for i>1, there are now random tables, say $\{h_i^*(x_i), (i=2, 3, \ldots, n)\}$. The hash function can be computed in two statements:

$$(t, h_{>1}) = \{h_2^*[x_2] \oplus h_3^*[x_3] \oplus \ldots, \oplus h_n^*[x_n]\} \quad (23)$$

$$h(x) = h_{>1} \oplus h_1[x_1 \oplus t] = h_2^*[x_2] \oplus h_3^*[x_3] \oplus \ldots, \oplus h_n^*[x_n] \oplus h_1[x_1 \oplus t] \quad (24)$$

A highlight of twisted tabulation is its minimalistic nature, adding very little to the cost of simple tabulation with significantly stronger guarantees. Twisted tabulation uses n position/character lookups into tables with two entries, just like simple tabulation, though with larger entries. Essentially twisted tabulation differs from simple tabulation by two operations, and will be almost as fast as simple tabulation.

Simple tabulation can also be used to get high independence when applied twice. More precisely, when using two independent simple tabulation functions using two independent hash functions h(x) and f (x) as shown earlier, then $g(x)=h(x) \oplus f(x)$ is also k-independent. That is:

$$g(x) = \{h_1[x_1] \oplus h_2[x_2] \oplus \ldots, \oplus h_n[x_n]\} \oplus \{f_1[x_1] \oplus f_2[x_2] \oplus \ldots, \oplus f_n[x_n]\} \quad (25)$$

This shows that the double tabulation that composes two simple tabulation functions simply applies one to the output of the other, and it is shown that this yields very high independence. For a given set of size proportional to that of the space consumed, the double tabulation gives fully-random hashing and reaches near-optimal independence for given time and space.

Adding random bits to Bloom filters should have no serious effect on their similarities as discussed above. Furthermore, fewer phantom atoms could be filtered, so that altogether more possible atoms appear the most frequent Bloom filters. This makes the assignment of candidate atoms to bigrams much more difficult.

In a sample protocol, two data holders, holding lists of names, can build an embedding space from random strings and embed their respective strings therein (e.g., using the SparseMap method). Then, individual data holders send the embedded strings to a third party which determines their similarity. To create the embedding space, data holder A generates n random strings and builds z reference sets from them. Next, A reduces the number of reference sets by the greedy resampling heuristic of SparseMap to a preferred set (e.g., optimal set) of k<z reference sets. These k reference sets are used to embed the names in a k-dimensional space. The coordinates for a given name are approximations of the distances between the names to the closest random string in each of the k reference sets in terms of the edit distance. As a result, an individual name A receives a k-dimensional vector. After receiving the k reference sets from A, B embeds his names in the same way. Finally, the data holders send their vectors to a third party, C, who compares them using the standard Euclidean distance between them. Using SparseMap allows the mapping of strings into the vector space avoiding prohibitive computational costs. This is accomplished by the reduction of dimensions using the greedy resampling method and by the distance approximations. However, the linkage quality can be significantly affected by applying the greedy resampling heuristic. However, the methods to achieve the performance gains can negatively affect the accuracy of the protocol. Another problem with this protocol is that the third party can be able to mount a statistical attack based on the data it receives. However, this can be mitigated by way of encryption.

Figure 3A:
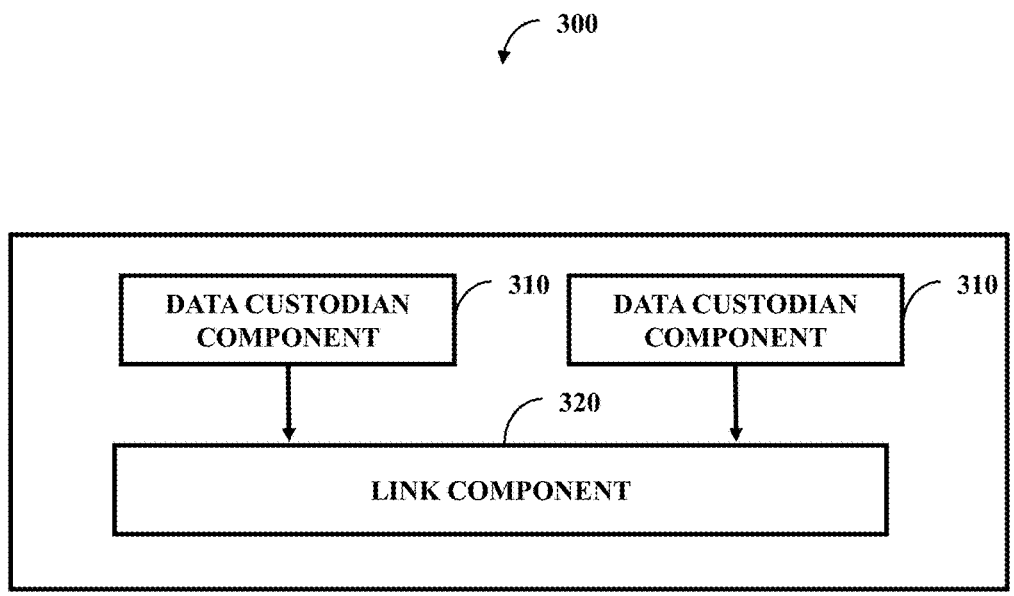
FIG. 3A illustrates one embodiment of a system comprising a data collection component set and a link component.
Figure 3B:
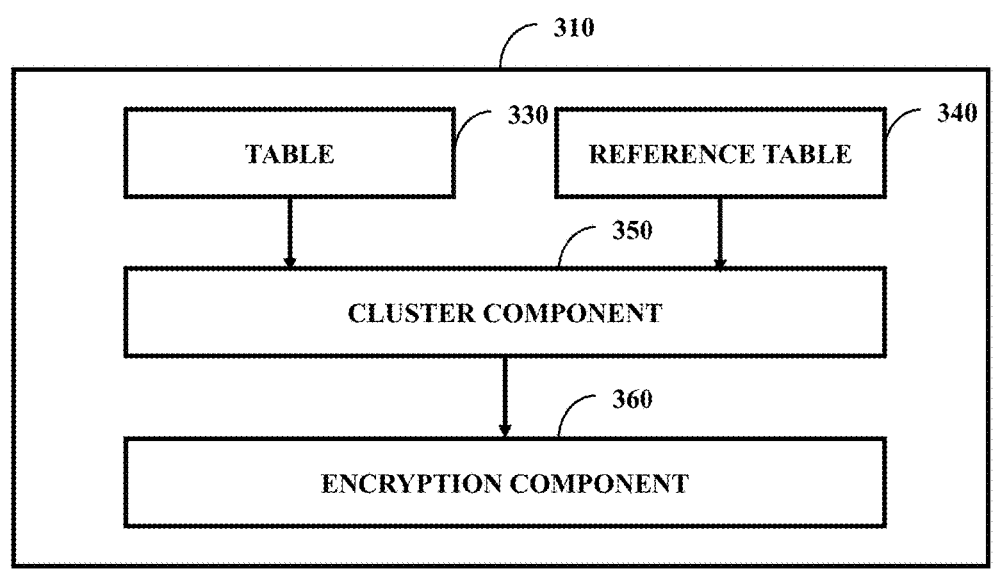
FIG. 3B illustrates one embodiment of the data custodian component comprising a table, a reference table, a cluster component, and an encryption component.

FIG. 3A illustrates one embodiment of a system 300 comprising a data collection component set (illustrated as two data custodian components 310) and a link component 320. FIG. 3B illustrates one embodiment of the data custodian component 310 comprising a table 330 (e.g., table A), a reference table 340 (e.g., a reference table R), a cluster component 350, and an encryption component 360. The cluster component 350 can be configured to find a data cluster of similar names by comparing names in the table 330 with names of a reference table 340. The encryption component 360 can encrypt the name(s) of the data cluster. The link component 320 can be configured to take the data clusters (e.g., the encrypted name(s) of the data cluster), which can be outputted by the data custodian component 310, and compare them to determine a matching pair set (a set being one or more).

In this, the protocol can be based on reference strings common to A and B. For a given identifier, database holders can compute the distances, d, between identifier strings and reference strings in the set. If d is less than a threshold $\delta$, the respective reference string can be encrypted using a key previously agreed on by A and B. For an individual identifier string, the resulting set of encrypted reference strings along with their distances, d, and an ID number form a tuple. Database holders send their tuples to a third party C, ID numbers where the encrypted reference strings agree, C sums the distances, d, and finds the minimum of this sum. If this minimum lies below a second threshold $\delta_{min}$, the two original identifier strings are classified as a match. The performance of the protocol can depend on a set of reference strings.

An approximate string matching algorithm can comprise identifying, by way of the cluster component 350, a cluster of values for an individual string (e.g., from the public reference tables using an edit distance function). The encryption component 360 can encrypt the cluster as string values and send the encrypted string values, along with their distances, to the link component 320 (e.g., a linking service). The link component 320 can calculate a matching score from the information sent from the two data sources that are the data custodian components 310 (e.g., a data custodian).

In one embodiment, encrypted reference data from the reference table 340 is sent to the linking service together with associated distance values. Not sending the actual encrypted data can improve data privacy as the actual data does not leave the data custodian, even in an encrypted form, and is thus less available to other parties.

In one embodiment, an edit distance function is used to identify a cluster of strings, or neighborhood, from the reference table 340 for an individual string. The individual string is compared to other strings in the reference table 340 using an edit distance function. If the edit distance is less than a threshold, $\delta_{min}$, then the string in the reference table 340 is added to the cluster. The reference table 340 can be a collection of unique strings reflecting the domain of the strings to be matched.

In one embodiment, encrypting and transferring comparison results can occur. In one example, data confidentiality requirements may exist, such as for personal medical information. Because of the data confidentiality requirements, sensitive fields, such as names and addresses, are encrypted before they are sent outside the original data custodian. In order to make comparison at the linking service, a secret encryption-key can be generated and shared among custodians (and yet be unavailable to the linking service). After the encryption is completed, the individual data custodians can send the values in the cluster, along with their distance from the original value to the linking service.

It can be expected that clusters will overlap if a pair of names is similar. The intersection of the two clusters can be found by comparing the encrypted values (equality) of names in the two clusters. Using the triangle inequality property, one can calculate the upper bound of the distance between the name pair via each of the names in the intersection region. If the minimum distance is less than a certain threshold, $\delta_{min}$, the string pair is said to match.

One approach to solve the privacy-preserving record linkage problem for numerical keys can be performed by using anonymized versions of the data sets for a first linkage step that is capable of classifying a large portion of record pairs correctly as matches or mismatches. Those pairs which cannot be classified as matches or mismatches will be used in a costly secure multi-party protocol for computing similarities.

The attack on the Bloom filter-based secured implementations also strongly depends on comparing the observed frequencies of atoms and expected bigram frequencies. The expected bigram frequencies are highly skewed. Hence, the success of an attack can be reduced if the frequency distribution of q-grams/bigrams is modified artificially. This could be achieved, for example, by the insertion of random strings that contain rare bigrams. Thus, the overall frequency distribution of hashed bigrams can be closer to a uniform distribution, which makes a correct assignment of candidate atoms to bigrams more difficult.

Fake profile items, which can also be referred to as dummies, can be added to the profile and some original profile items can be taken away from the profile. With a large number of fake items independently added to the profile (e.g., each time it is sent to the server), two noisy profiles from the same client look different, making it difficult for the server to link them. Even though a noisy profile has its advantages over a generalized profile, they do not come without disadvantages. One disadvantage can be that if many fake items are added to the profile to ensure reasonable unlinkability, the noisy profile can be very large. Since the noisy profile is sent to the server often (e.g., with each request), the communication overhead can be too much for energy-constrained devices such as smartphones. The fake items can be picked from an unbiased sample of the items in the profiles of users in the system. If the sample from which the client chooses fake items is biased (e.g., all items are related to football) and if the bias is known to the server, it can easily filter the noise out to identify the real items. Thus, the client can work to find a trusted third party who computes an unbiased sample. The sample can be updated as users join and leave the system, as new profile items appear or as items' popularity changes.

One protection feature can be injection of a fake phonetic code. In one example, a method using phonetic encoding can be used to account for typing mistakes, coupled with encryption for privacy. The method can inject fake phonetic codes to protect against frequency attacks.

Another Bloom filter feature can be using record-/profile-level linkage. The process of record-/profile-level linkage can seek to integrate instances that correspond to the same entity. In secure record/profile linkage, the composite Bloom filters with the samples of bit positions from the separate Bloom filters for individual identifiers can be drawn. Sampled bits of the individual identifiers can be concatenated and finally permuted. Applying frequency-based cryptanalysis attacks using compromised encodings would not be promising, because they include multiple identifiers, like clocks, and their bit positions are sampled from the initial Bloom filters. Thus, the assignment of possible atoms to bigrams is much more difficult in this case as well.

Bloom cookies can encode a user's profile in a compact and privacy-preserving manner, without preventing online services from using it for personalization purposes. The Bloom cookies design is inspired by the analysis of a large set of web search logs that show drawbacks of two profile obfuscation techniques, namely profile generalization and noise injection. Profile generalization can significantly hurt personalization and can fail to protect users from a server linking user sessions over time. Noise injection can address these problems, but at a cost of a high communication overhead and a noise dictionary generated by a trusted third party. In contrast, Bloom cookies leverage Bloom filters as a privacy-preserving data structure to provide a more convenient privacy, personalization, and network efficiency tradeoff. An example benefit can be providing similar (or better) personalization and privacy than noise injection (and profile generalization), but with an order of magnitude lower communication cost and no noise dictionary. Bloom cookies can be used for personalized web searches. An algorithm can be employed to automatically configure the noise in Bloom cookies given a user's privacy and personalization goals.

Various metrics can be used with regard to a Bloom filter, such as quality of personalization, unlinkability, and a similarity coefficient. In one embodiment, quality of personalization by average rank can be defined as:

$$\text{Avg\_rank}_i = \frac{1}{|R_i^c|} \sum_{r \in R_i^c} rank_r \quad (26)$$

where $R_i^c$ is the set of results clicked for a given query i, and $rank_r$ is the rank of the result r assigned by the personalization algorithm. The smaller the average rank, the higher the personalization quality.

The unlinkability element of the matric can be a privacy measure. In one embodiment, two metrics of unlinkability are used. Unlinkability can measure the degree of unlinkability of a set of elements as entropy. A partition of the set of elements (e.g., meaning a division of the set as a union of non-overlapping and non-empty subsets) represents a possible way to link elements in the set to each other (e.g., given a set of 4 elements, 15 partitions exist). In this context, linking can mean identifying user profiles collected in different contexts (e.g., different time periods) that belong to the same user. The unlinkability of the elements in the set can be measured as entropy:

$$H(X) = \Sigma_{x \in X} p(x) \log_2 p(x) \quad (26)$$

where X denotes the set of possible partitions and p(x) is the probability mass function, $0 \le p(x) \le 1$ denoting the probability that x is the correct partition.

Without additional information, a priori, partitions can be equally possible so the probability distribution is uniform and the entropy of the elements is at its maximum $$\left(H_{priori}(X) = -\log_2\left(\frac{1}{m}\right)\right).$$

However, an adversary with access to some information about the partitions can, a posteriori, rule out some candidate partitions, thus lowering the entropy.

In this context, a malicious server can observe the content of the user profiles and assign higher probabilities to certain partitions. The degree of unlinkability of the set of elements against an adversary can therefore be defined, in one example, as the ratio between the a posteriori entropy to the a priori entropy:

$$U(X) = \frac{H_{posteriori}(X)}{H_{priori}(x)} \quad (27)$$

Unfortunately, this definition does not scale to a large set, as enumerating many possible partitions is a computationally hard problem. Therefore, some simplifying assumptions can be made.

Assuming that there is a constant number of users in the system over time, a user whose profile is seen in the time period i (where the time period is a fixed length of time of the order of a few weeks) will have a profile also in the time period (i+1). Another assumption can be made that historical information about some users that interact with the system is available (this allows for training of a linkability model that a potential adversary may build). A further assumption can be instead of computing all possible partitions to calculate the system unlinkability, computation can be limited to per-user unlinkability by comparing a user's profile in time-period i with other profiles in time-period (i+1) independently of the other users in the system.

Figure 4A:
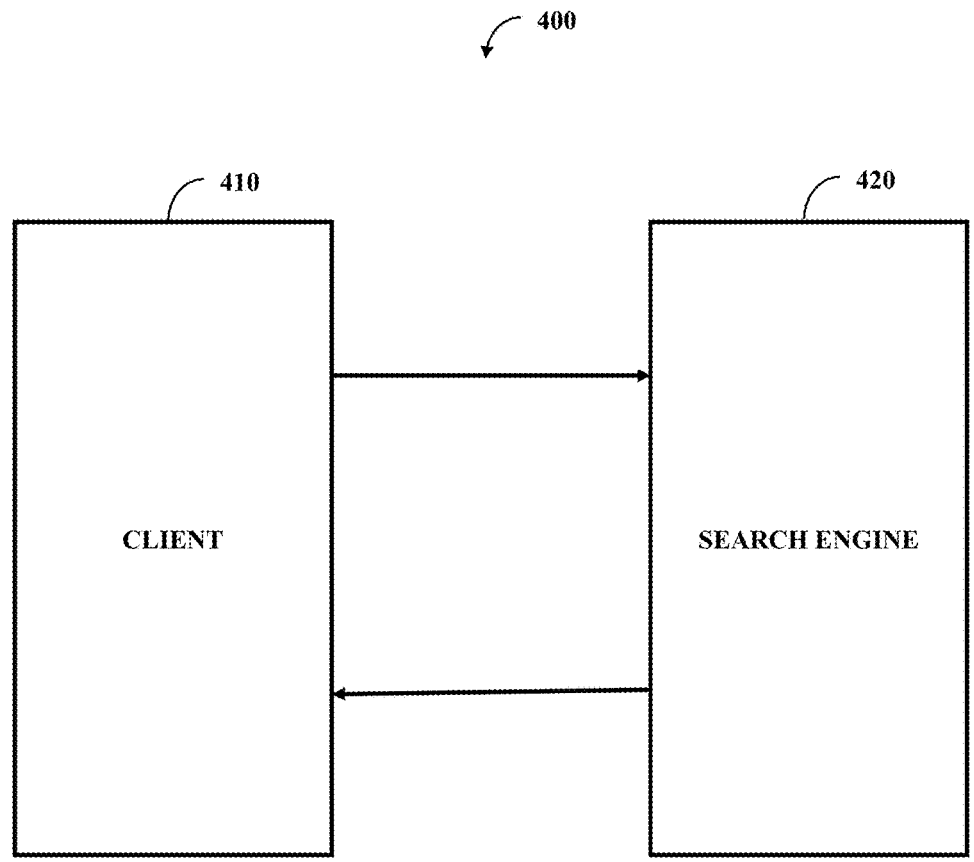
FIG. 4A illustrates one embodiment of an environment where a client communicates with a search engine.
Figure 4B:
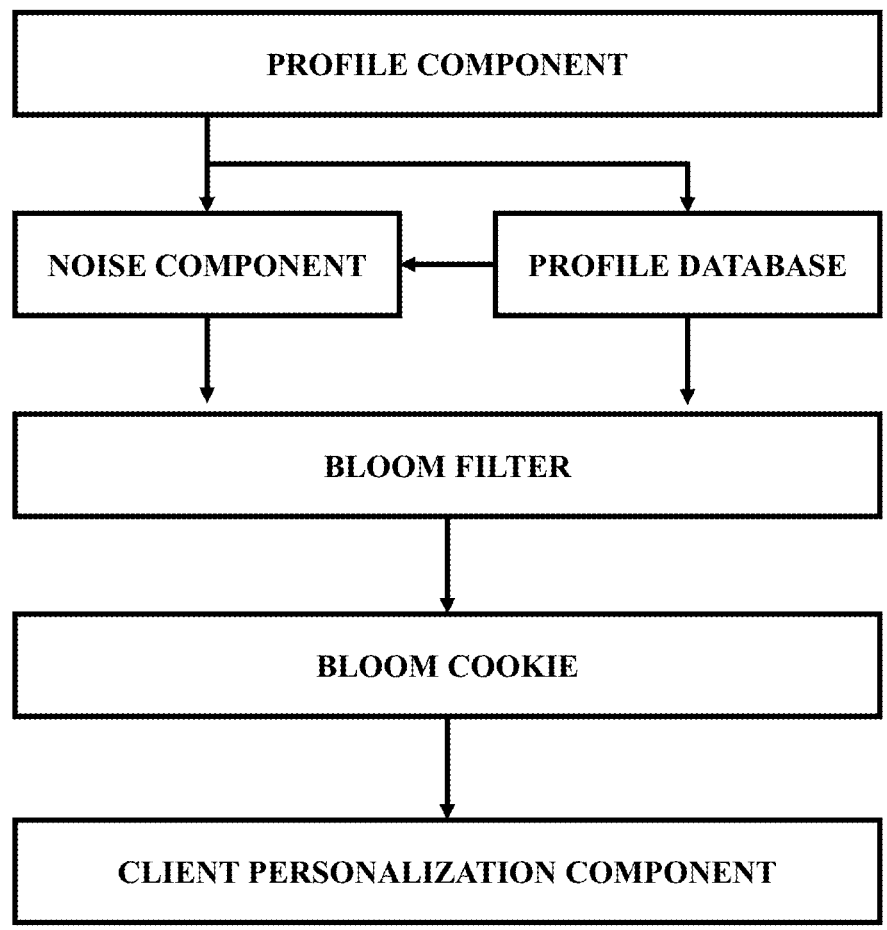
FIG. 4B illustrates one embodiment of the client.
Figure 4C:
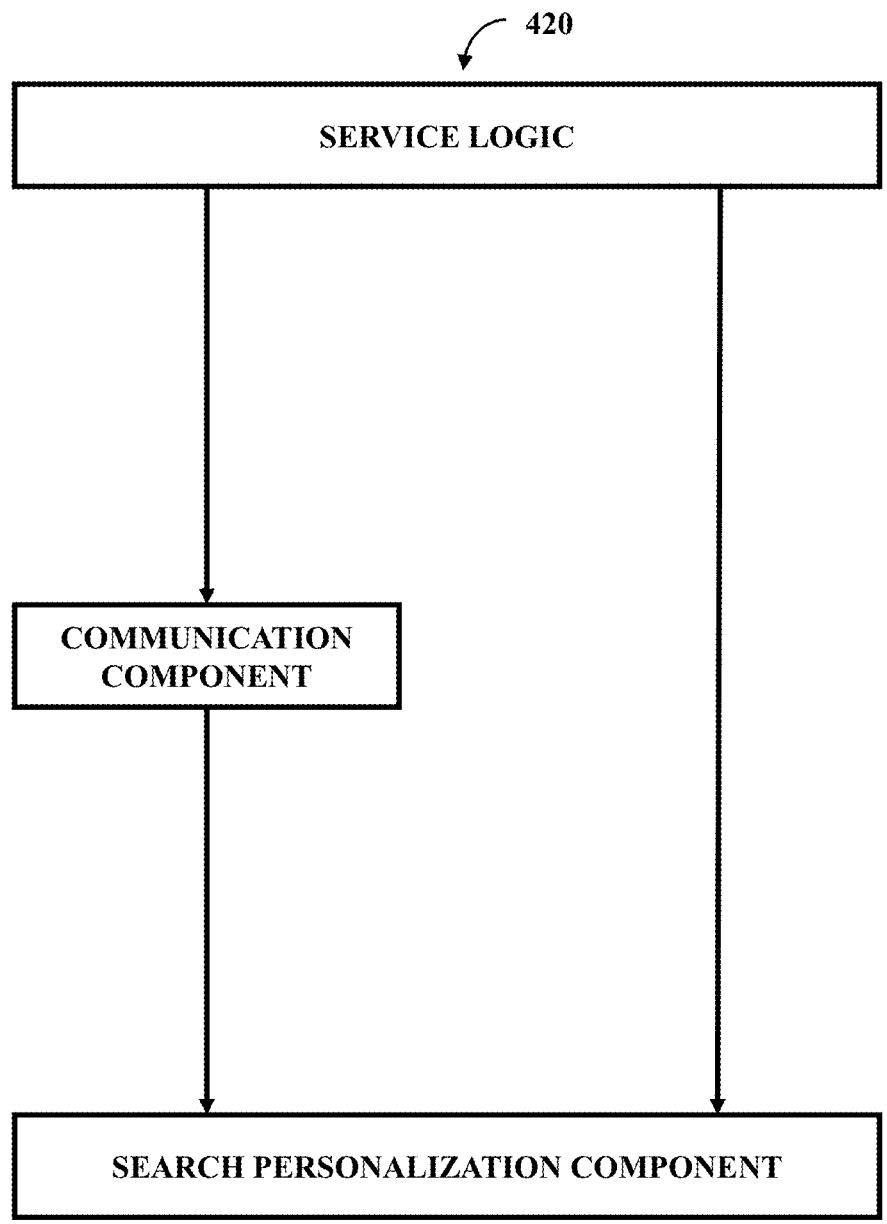
FIG. 4C illustrates one embodiment of the server.

FIG. 4A illustrates one embodiment of an environment 400 where a client 410 communicates with a search engine 420 (e.g., a server). FIG. 4B illustrates one embodiment of the client 410 while FIG. 4C illustrates one embodiment of the search engine 420. FIGS. 4A-4C can be collectively referred to as FIG. 4. In one embodiment, the client 410 retains the production component 110 and the access component 120 of FIG. 1.

FIG. 4 summarizes the Bloom cookies architectural framework applied to web searches. At the client 410, a profiler builds a personalization profile based on the user's search history. The profile (e.g., comprising URLs of the web sites the user visited most often) is fed into an obfuscator (comprising a noise component, a profile database, and the Bloom filter) which generates a Bloom cookie for the ongoing IP-session.

The obfuscator can configure the level of obfuscation of the profile through, in one example, two parameters: number of hash functions (k) and noise level (l). Note that, in principle, a Bloom filter's probability of false positives p depends on k and m (e.g., the larger k, the smaller p; the larger m, the smaller p). In practice, as shown below, m has little impact on the obfuscation achieved, so k can be varied for obfuscation purposes. m can be set to 1000-2000 bits.

The parameters k and l can be computed by the noise generator (e.g., once for each IP-session). This can be accomplished by using a prediction algorithm that given a user's personalization and privacy goals together with a history of profiles previously sent to the server predicts a preferred (e.g., optimal)<k; l> configuration. The Bloom cookie can be sent to the search engine 420 along with the user's search request, and this can stay constant for the current IP-session. At the search engine, a search personalization component can re-rank the search results based on the noisy user profile stored in the Bloom cookie. In one embodiment, a client-side personalizer can further refine the results and their rank based on the noise-free user profile which is known to the client.

In one embodiment, RAND and HYBRID can be used as an alternative to Bloom cookies, but can have higher costs (e.g., be larger in size). Bloom cookies can be based on Bloom filters. The Bloom filter can be used to store elements, say n, from a set E, and is implemented as a bits-string of size m with k hash functions. When querying if an element exists in the Bloom filter, false positives are possible but false negatives are not. The probability p of false positives can be controlled by varying m and k;

$$k = \left(\frac{m}{n}\right)$$

ln 2 minimizes when n=|E|.

One straightforward way to use Bloom filters is to insert the URLs from the noisy profile generated by RAND or HYBRID into a Bloom filter, which the client 410 sends to the search engine 420 along with queries. For personalization, the search engine 420 queries the Bloom filter for URLs contained in the search results for the submitted search query and re-ranks the results accordingly. The number of search results can be, in one example, in the range 10-100, which can make the number of Bloom filter queries acceptable. As the Bloom filter size can be significantly smaller than the actual list of URLs, this can reduce the communication overhead. However, this approach still does not remove the desire for a noise dictionary for RAND and HYBRID.

To avoid the use of a noise dictionary and reduce even further the communication overhead, noise is introduced at the bit-level of a Bloom filter. More specifically, it can be started with the exact profile of the client 410, the URLs present in the exact profile can be encoded into a Bloom filter, and then a random set of fake bits (one fake bit or more than one fake bit) can be inserted in the filter to 1. This can be called a data structure that comprises a Bloom filter of an exact profile, a set of fake bits, and a Bloom cookie. The presence of fake bits increases the false positive rate of the filter and acts as noise. The number of fake bits acts as a tuning knob to control the magnitude of noise.

Bloom cookies use Bloom filters as privacy-preserving data structures. There are at least five benefits that make Bloom filters useful for profile obfuscation—Efficiency, Noisy by Design, Non-Deterministic Noise, Dictionary Freedom, and Expensive Dictionary Attacks. For efficiency, in terms of size, Bloom filters are much more compact than a bag of URLs used by noise addition techniques such as RAND and HYBRID. This reduces the communication overhead of sending noisy profiles to the server. Bloom filters' false positives can be drawbacks in one context and advantageous in others. In one example, the false positives in a Bloom filter act as natural noise that can be controlled via various design parameters such as the number of hash functions. The level of noise introduced by Bloom filters can change automatically as the content of the filter changes. This makes it harder for an adversary to predict the level of noise utilized. Noise determinism can be a significant problem for standard noise addition techniques. By adding noise by setting random fake bits, Bloom cookies can work without a noise dictionary. This can be beneficial since addition of a noise dictionary can introduce additional overhead and privacy threats. Unlike some profile obfuscation techniques that represent noisy profiles as a list of profile items, Bloom filters represent them as an array of bits. To build a complete user profile, a potential adversary would query the Bloom filter for all possible elements thus making protection stronger.

By varying the noise level, a user can control the privacy-personalization tradeoff. A privacy-concerned user can choose to operate at the highest noise levels, while a user that values privacy and personalization in the same manner can decide to operate at moderate noise levels. An algorithm can be employed that automatically configures the noise parameters in the Bloom cookie given a user's privacy and personalization goals.

Pseudo-code of an algorithm for obfuscation parameters k and/or a Bloom cookie given a personalization and privacy goal can be as follows:

```
deffind_noise(sim, pergoal, privgoal, permodel, privmodel):
    simc = find_similarity_class(sim)
    solutions = [ ]
    for k in k_vals:
        per = scaling(interpolation(permodel[k]))
        priv = scaling(interpolation(privmodel[simc][k]))
        # find _min s.t. priv(_min) = privgoals
        _min = inverse(priv)(privgoal)
        # find _max s.t. per(_max) = pergoal
        _max = inverse(per)(pergoal)
        if _min <=_max: solutions.append((k, _min))
    return random.choice(solutions)
```

The algorithm takes as input a personalization goal specified as maximum percentage loss that a user is willing to tolerate (compared to the personalization obtained with exact profiles), and a privacy goal specified as the minimum unlinkability a user wants to achieve. In addition, the algorithm uses the history of profiles previously sent by the client to the server to compute the profile similarity over time. The algorithm returns the pair <k; l> for configuring the Bloom cookie.

The algorithm can employ two prediction models, one for personalization and one for privacy. The models can be trained using a set of users for which search history is available. The personalization model can be built by computing the loss in personalization for the training users when independently varying the parameters k and l (m=2000). Given a target personalization loss, the model predicts various <k; l> combinations by performing a linear interpolation between all measured data points.

To build the privacy model, the observation is that the similarity of a user's profiles is leveraged over time, which makes him/her more trackable. Hence, the greater the similarity, the more noise required to achieve a certain level of unlinkability. The goal of the privacy model is then to represent the relationship between similarity, unlinkability and <k; l>. The Jaccard similarity is computed between two consecutive 2-week profiles of the training users and then divide them in s=10 buckets based on the similarity value. For individual buckets, a privacy model can be created by doing a linear interpolation in a similar way as for the personalization model. For a desired level of unlinkability the model predicts the pair <k; l>. Thus, given a privacy goal and the similarity of a user's profile across time, the algorithm finds which similarity bucket the user belongs to, and then uses the appropriate privacy model for that bucket to predict <k; l>.

The privacy model provides a lower bound on the noise (e.g., with more noise higher unlinkability is achieved). The personalization model provides an upper bound (e.g., with more noise a larger personalization loss is experienced). The solution can be determined by randomly selecting a k among the possible values and using the minimum noise level for such k.

Bloom cookies encode a user's profile in a compact and privacy-preserving way, but do not prevent online services from achieving personalization. Compared to profile generalization and noise addition (techniques commonly employed in online privacy-preserving personalization systems) Bloom cookies provide a much better privacy, personalization and network efficiency tradeoff. Through the analysis of web search logs, it is seen that profile generalization significantly hurts personalization and fails in providing reasonable unlinkability.

Noise injection can address these problems, but comes with the cost of a high communication overhead and a noise dictionary which must be provided by a trusted third party. Bloom cookies leverage Bloom filters as a privacy-preserving structure to deliver similar (or better) personalization and unlinkability than noise injection, but with an order of magnitude lower communication cost and no noise dictionary dependencies.

The process of record linkage seeks to integrate instances that correspond to the same entity. Record linkage can be performed through the comparison of identifying field values (e.g., Surname), however, when databases are maintained by disparate organizations, the disclosure of such information can breach the privacy of the corresponding individuals. Various private record linkage (PRL) methods can be used to obscure such identifiers, but they vary widely in their ability to balance competing goals of accuracy, efficiency and security. The tokenization and hashing of field values into Bloom filters enables greater linkage accuracy and efficiency than other PRL methods, but the encodings may be compromised through frequency-based cryptanalysis. So, an objective can be to adapt a Bloom filter encoding technique to mitigate such attacks with minimal sacrifices in accuracy and efficiency. To accomplish these goals, a statistically-informed method can be used to generate Bloom filter encodings that integrate bits from multiple fields, the frequencies of which are provably associated with a minimum number of fields. This method enables a user-specified tradeoff between security and accuracy.

In one embodiment, a record can comprise f fields, and records to be linked are contributed by two database holders, referred to as Alice and Bob. A denotes the dataset of records provided by Alice, |A| is the number of records, $a_x$ indicates the $x^{th}$ record within set A, and $a_x[i]$ refers to the value of the $x^{th}$ field in record, $a_x$, where $i \in \{1, \ldots, f\}$. Similarly, B, |B|, $b_y$, and $b_y[i]$ correspond to the set of records provided by Bob.

In the PRL process, Alice and Bob locally encode their records and send the encodings to a third party (say, attacker), Charlie, which is where they are compared. The goal is to enable the attacker (e.g., Charlie) to correctly classify record pairs (i.e., A×B) into the classes M (Predicted Matches) and U (Predicted Non-matches) such that the record pairs in M refer to the same individual (e.g., True Matches) and the record pairs in U refer to different individuals (e.g., True Non-matches).

The PRL transformation strategies shows that FBF encodings provide highly accurate linkage results in a reasonable running time. One action of the FBF encoding is that individual field values can be treated as a string and decomposed into a set of tokens of length q, or q-grams. To account for the first and last characters, the value can be padded with (q−1) blank characters on each end. Another action of the FBF encoding can be that individual q-grams can be hashed into an FBF of length m bits using k hash functions. The designator $m_{FBF}$ can be used to represent the number of bits in an FBF (RBF). The encodings can be compared using a set-based similarity measure, such as the Dice coefficient as described above. However, the FBF encodings can be subject to frequency-based cryptanalysis attacks and the record-level Bloom filter encodings can be devised to prevent those attacks.

Figure 5:
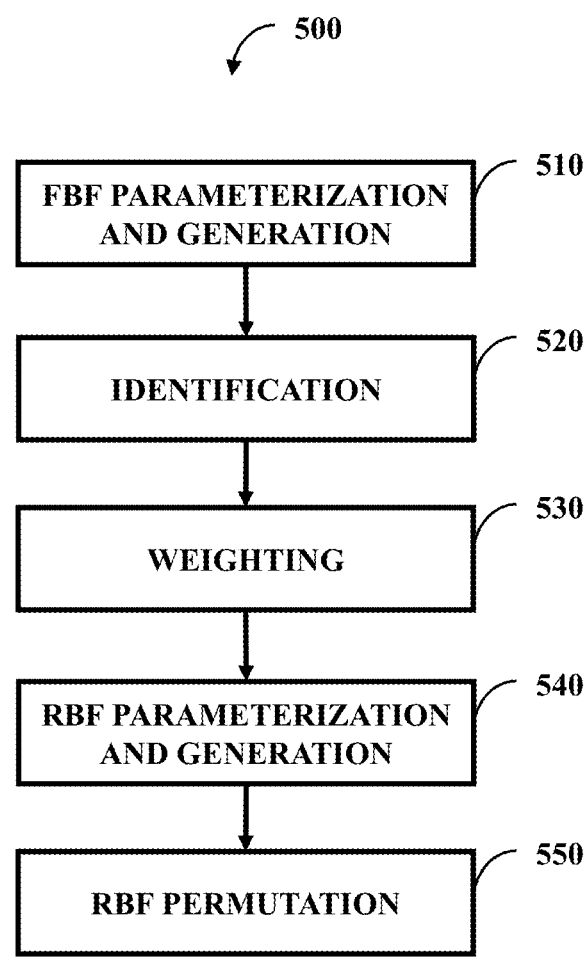
FIG. 5 illustrates one embodiment of a method that comprises five actions.

FIG. 5 illustrates one embodiment of a method 500 that comprises five actions 510-550. The method 500 builds upon the strengths of the FBF encodings, such as their high accuracy and expedient running time, while increasing resistance to frequency-based cryptanalysis. Composite RBF encoding can provide stronger resistance against frequency analysis and therefore greater security. At 510, the method can receive field values and perform FBF parameterization and generation. FBF parameters can be selected to maximize security. As FBF encodings can be vulnerable to frequency-based crypto-attacks, the FBF with eligible bit identification and field-weighting scheme can be transformed to record-level Bloom filter encodings for preventing these attacks.

At 520, identification of an eligible bit set can take place. The bit set can be one or more bits. Bits sampled from the FBFs can be chosen to maximize security.

At 530, field weighting can occur. As part of the field weighting, a scheme can be applied. The scheme can be applied to determine how many bits should be sampled from each FBF.

At 540, RBF parameterization & generation can occur. As part of this, RBF parameters can be established. In view of this, bits can be sampled from the FBFs resulting in an RBF encoding.

At 550, RBF permutation can take place. Bits can be randomly ordered using a permutation agreed upon by Alice and Bob. With this, RBF encoding can be outputted.

With the method 500, strings in multiple fields (e.g. Forename, Surname, and City) can be mixed into a single RBF. As noted earlier, the strings can be initially split into their respective q-grams, which are hashed into FBFs. These FBFs can then be weighted according to their discriminatory power for record linkage. Based on this weighting, for example, Forename and City will each contribute 25% of the bits to the RBF, while Surname will contribute 50% of the bits. The RBF is then composed of bits sampled from each FBF and the resulting bit locations are finally permuted.

The FBF parameterization affects the security of the resultant encodings. In cryptanalysis, attacker (e.g., Charlie) attempts to map bits in the RBF to the fields from which they were drawn. When successful, the attacker can mount an attack using the FBFs as inputs. Therefore, evaluating the extent to which the attacker can map bits in the RBF to the field from which they were drawn is important to characterize the security of the RBF. In particular, how much information the attacker can gather can be determined by modeling the frequency with which bits are set under two FBF parameterization methods: 1) static and 2) dynamic FBF sizing.

In the static FBF sizing strategy, the k and m values are held constant across the fields, regardless of the expected number of q-grams to be encoded in the field. In this case, observation of the percentage of bits set to 1 may allow the attacker to determine some information about the length of the encoded value and the number of hash functions used in encoding. Shorter fields, such as Gender, result in FBF encodings with fewer bits set to 1 than longer fields, such as Forename.

Consider an example where q=2, k=15, and m=500. Gender, encoded "M" or "F", will contain two q-grams for the field value. Therefore, for gender encoding, a maximum of 30 bits can be set (15 per q-gram), in one example, which corresponds to 6% of the bits in the FBF. However, if Forename has an average of 6 letters per record, this corresponds to 7 n-grams and a maximum of 105 bits that can be set, which corresponds to 21% of the bits in the FBF. This variability in the average number of bits set across fields in statically sized FBFs is discussed above. As a consequence of this variability in the average number of bits set across fields in statically sized FBFs, when static parameters are applied to the field, the attacker can observe the percentage of bits set in a FBF. With this information, the attacker can infer the length of the value encoded in the filter and the number of hash functions used in encoding.

For dynamic FBF sizing, it can be anticipated that tailoring the encoding parameters to the specific properties of each field will limit the extent to which the attacker can determine the field from which a bit was drawn. Therefore, it is proposed to dynamically size the Bloom filters (e.g., setting the $m_{FBF}$ value) such that the same percentage of bits are expected to be set to 1 in the FBFs of the individual fields. Additionally, let, in this example, the expected frequency at which a given bit is set in the Bloom filter encoding to be equal to 0.5. The justification for this choice is that in order to maximize entropy, and therefore maximize security, half of the bits should be set. In this case, the attacker would observe that approximately half of the bits are set to 1 and would gain little information about which field values are encoded in the filter.

In one example, let the expected frequency at which a bit is set, p, be equal to 0.5 and let g be the number of items (e.g., q-grams) stored in the FBF. The probability that a certain bit remains unset at a value of 0 is $p=1-(1/m)^{kg}$. Therefore, if a value is selected for k, and it is held constant, a component can calculate the number of bits for the FBF by solving for m in the previous equation. This yields:

$$m = \frac{1}{1 - \sqrt[kg]{p}} \quad (28)$$

Now the information content can be measured (as indicated by average field value length) and associated with a field and the FBF length can be adjusted accordingly. The values of $m_{FBF}$ (e.g., number of bits in each FBF) for the dataset and the average number of bits set across fields in dynamically sized FBFs can be computed.

Due to collisions, the expected frequency at which a bit is set can be controlled. The control can be of dynamic size that can have a more uniform average frequency across fields than the FBFs of static size. It can be more difficult for an attacker to determine from which FBF a bit was drawn when the FBFs are dynamically sized.

A statistically-informed method can be used for determining which bits should be sampled from an FBF so that the resulting RBFs are resistant to frequency analysis. For example, when the attacker attempts to determine the plaintext values encoded in an RBF, a first action can be to map RBF bits back to the fields from which they were drawn, based on the frequency with which a bit is set. This is particularly true if the frequency distributions of the bits within fields is distinctive across fields. For example, it can be expected that the FBF encodings corresponding to fields having a small domain, such as Gender and Ethnicity, and will have a frequency distribution that is markedly different from fields having a large domain, such as Surname. Therefore, it is possible that the frequency at which a given bit in the RBF is set may betray from which FBF it was drawn. For example, a field can comprise a bit set that exactly 50% of the time corresponds to Gender. Then, when the attacker observes this frequency for a particular bit, he can conclude it encodes information about Gender.

Individual bits can be set at a frequency. A heat map of the frequencies can be created with which bits are set across FBFs of both static and dynamic size. The frequency distributions for categorical fields, such as Gender, and other fields can be created. In an example, it is seen that the gender field for static and dynamic case is less uniformly distributed than for string-based fields such as surname and city. This is due to the fact that since categorical variables can take on a limited number of values, many of the bits in the FBF are never set. Those bits that are set are relatively frequent because many individuals in the population have the corresponding value.

In general, FBFs of dynamic size are more uniformly distributed than the FBFs of static size. This provides further evidence that an attacker would have greater difficulty using this frequency information. The results of this process should be coordinated, so that Alice and Bob select the same FBF bit locations to compose their RBFs. Note that if Alice and Bob may have data on reasonably similar populations, then either Alice or Bob could execute this process on their dataset and communicate the result to the other party. In the event that the populations are anticipated to be significantly different, the protocol may benefit from assistance of an additional third party.

There still may be information the attacker can exploit. Specifically, the frequency at which bits are set is not uniform. By breaking down the frequencies into ranges, the attacker may map bits in the RBF to the FBF from which they were drawn. To limit the extent to which the attacker can map RBF bits back to the FBFs from which they were drawn, a security constraint $S_c$ is introduced. This constraint states that only bits that can be mapped back to at least $S_c$ fields, based on an analysis of the frequency at which bits are set, can be included in the RBF.

By avoiding bits set at frequencies that are unique to a single field, or a small number of fields, the resultant RBF encodings are more secure. This is because it becomes more difficult for an attacker to leverage frequency information to map RBF bits back to the FBFs from which they were drawn. The data holders can establish a security constraint $S_c$ by allowing only bits that can be mapped back to $\geq S_c$ fields, by leveraging frequency information, to be included in the RBF. Therefore, a higher value of q implies additional computations required to compromise RBF encodings and thus greater security.

Field weighting can be employed for the Bloom filter. Field weighting is a method for determining the percentage of bits in the RBF that should be sampled from an individual FBF, which is called the weight attributed to the field. The field weighting mechanism is based on the discriminatory power of the field (e.g., the extent to which it supports linkage). It hypothesizes that sampling bits according to a weighting based on the discriminatory power of individual fields will provide RBFs that facilitate highly accurate record linkage. For example, Surname is intuitively more useful in resolving identity than Gender, so it is natural to devise a method that samples more bits from the FBF corresponding to Surname. For example, if Alice and Bob know the discriminatory power of each field, they can weight each field accordingly. In the absence of this knowledge, the weights can be estimated, such as by using a probabilistic approach (e.g., the Fellegi and Sunter (FS) weighting approach). This approach can employ computing an agreement weight $w_a$, (e.g., a positive value) and a disagreement weight $w_d$ (e.g., a negative value) for individual fields based on the conditional probability of field agreement. The FS weights can be used to measure the relative discriminatory power of the individual fields. The following equations can be used as a mechanism for combining the agreement and disagreement weights into a single weight, w[i], associated with each field i:

$$\text{range}[i] = w_a[i] - w_d[i] \quad (29)$$

$$w[i] = \frac{\text{range}[i]}{\sum_{i=1}^{f} \text{range}[i]} \quad (30)$$

The weight associated with an individual field can be derived by normalizing the range of a single field by the sum of the ranges of the agreement and disagreement weights over the fields (e.g., all fields). The resulting weight is a measure of the relative discriminatory power of an individual field, as compared to other fields. This weight can be used to determine the percentage of bits drawn from an individual FBF for inclusion in the RBF. The $w_a$, $w_d$, range, and w values for the dataset are used for calculation of weight. By applying this approach, a varying number of bits is sampled from different individual fields. For instance, the Surname and Forename fields can include 24% and 22% of the bits in the RBF, respectively.

To determine the actual number of bits to be drawn from an individual FBF, a value should be selected for the number of bits to be included in the RBF (i.e. $m_{RBF}$). To provide a baseline, it can be assumed that the eligible bits that satisfy the security constraint from the individual fields should be included in the RBF. Given this assumption and the weight associated with each field, the lower bound for $m_{RBF}$ is calculated, where the individual fields are included in full and at the relative discriminatory power calculated. The maximum of these values is to be $m_{RBF}$.

As this is the maximal value for $m_{RBF}$ for the fields, this is selected as the length for the RBF. The number of bits to be drawn from individual FBFs is then selected in accordance with the field weights. The bits are selected at random, with replacement, to construct the RBF. By doing so, the measure of distance between RBFs will be proportional to the contribution of each field.

The bits of the RBF can be shuffled according to a random permutation agreed upon by the communicating parties (e.g. Alice and Bob). This permutation should not be made public and is considered a "key" used to make the RBF encodings more secure. The shuffling prevents the attacker (e.g. Charlie) from determining which FBF the bits in the RBF correspond to, based on their order.

This method that constructs RBF encodings for use in PRL is flexible and provides for several design choices, which users can adapt to suit their requirements with respect to security, the speed at which the encodings can be compared to one another, and the desired accuracy of similarity comparisons based on the encodings. The use of FBFs of dynamic size and the sampling of random bits from FBFs are in a measure commensurate with the discriminatory power of the field and are beneficial for secure RBF encodings that facilitate accurate similarity calculations.

Figure 6:
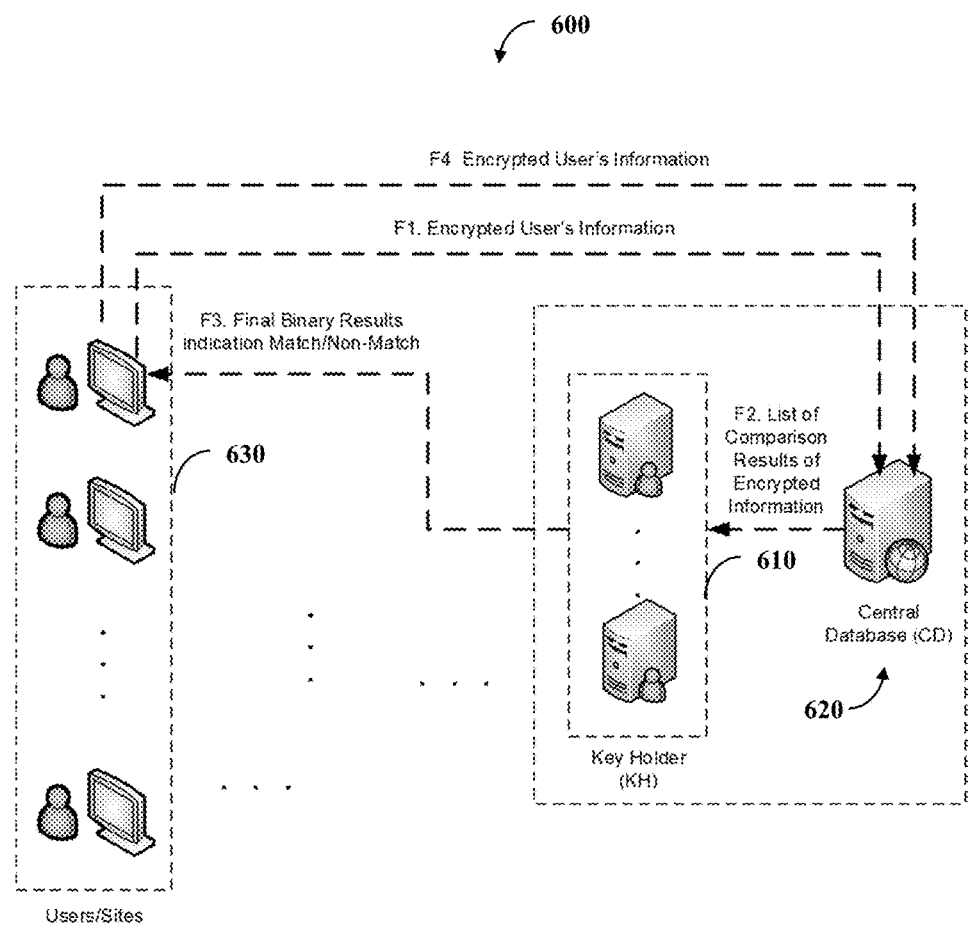
FIG. 6 illustrates one embodiment of a system comprising a key holder, a central database, and users/sites.

FIG. 6 illustrates one embodiment of a system 600 comprising a key holder 610, a central database 620, and users/sites 630. The system 600 can employ a fake bit insertion strategy for matching user records or querying a user database securely. This can assist in preventing attacks launched based on the observed frequencies of atoms and expected bigram frequencies of Bloom filter related implementations. To employ this strategy, a protocol can be used with three functional entities—the key holder 610, the central database 620, and the users/sites 630.

The key holder (KH) 610 can be a semi-trusted third party who generates key pairs and performs computations on intermediate results. The KH role is not strictly necessary if sites and the central database (CD) 620 can communicate in the context of a two-party protocol in which both parties perform computations on each other's encrypted data. The KH 610 can be used when the CD 620 does not have the encryption capabilities. When used, the CD 620 can hold the encrypted data from the sites (e.g., that are part of the users/sites 630) and processes queries with the KH 610. The sites can provide information about the users and execute queries on behalf of the users to the CD 620 for storing in or retrieving the information from the CD 620.

Figure 7:
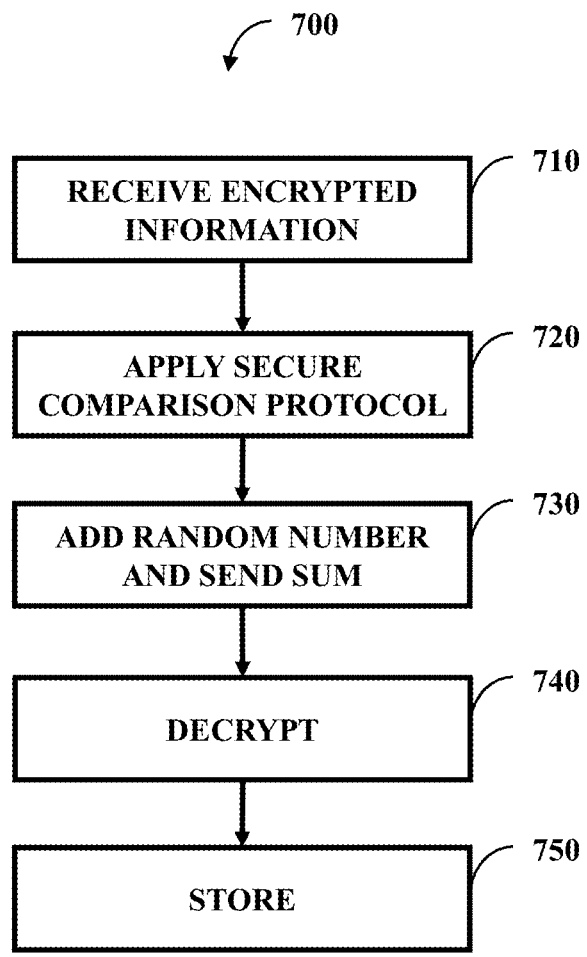
FIG. 7 illustrates one embodiment of a method comprising five actions.
Figure 8A:
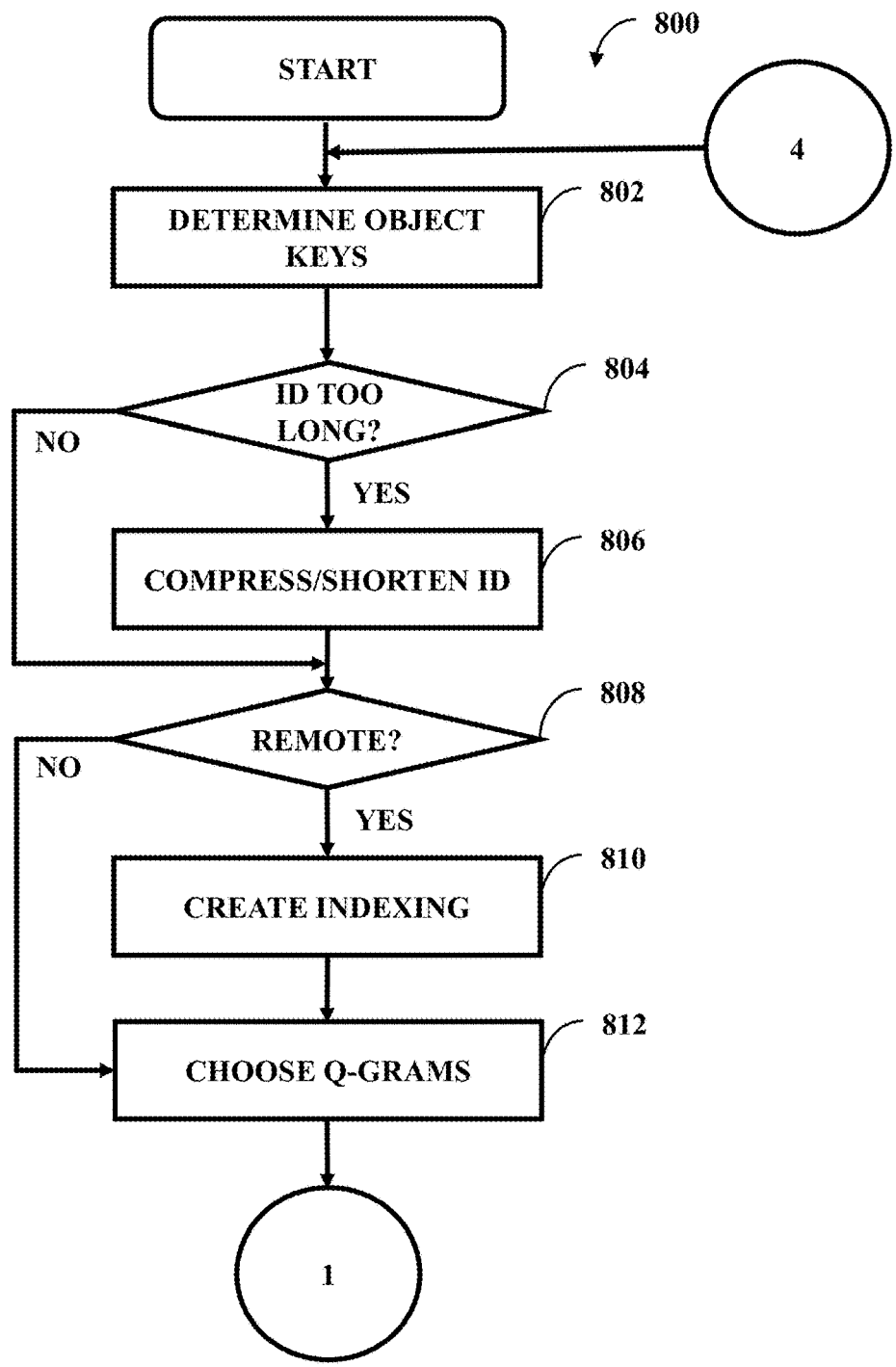
FIGS. 8A-8D illustrate one embodiment of a method.
Figure 8B:
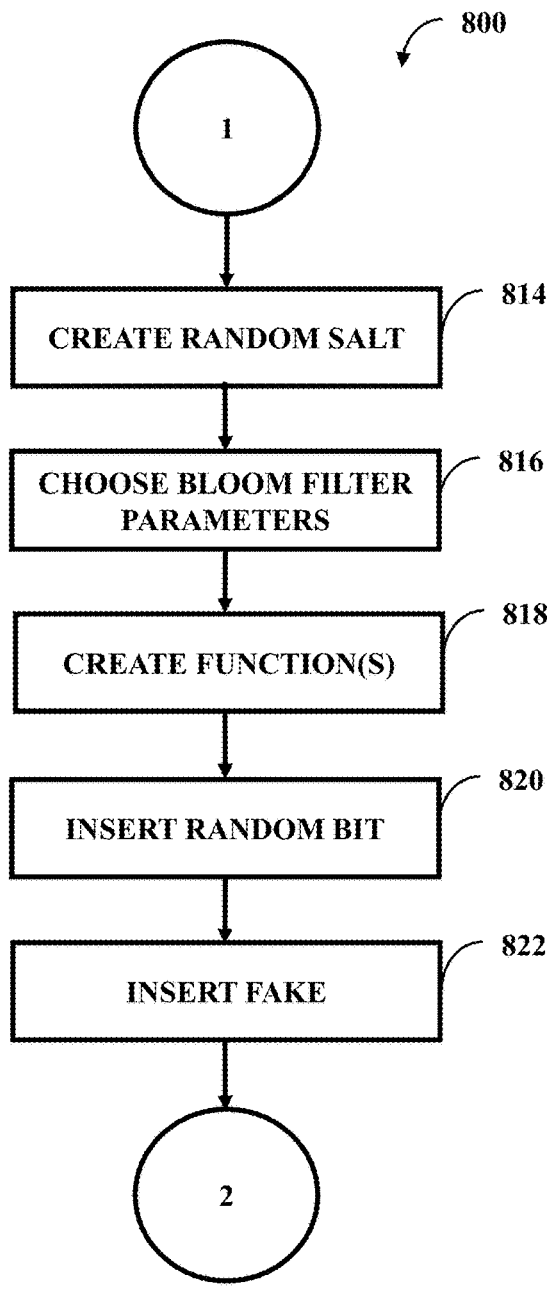
Figure 8C:
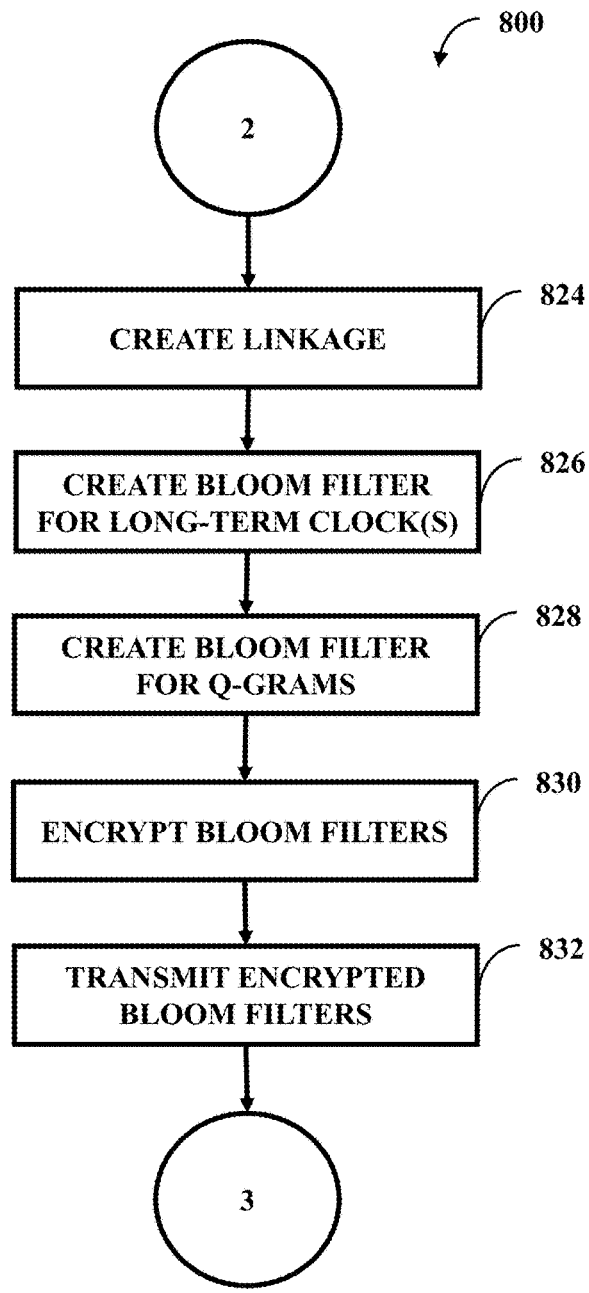
Figure 8D:
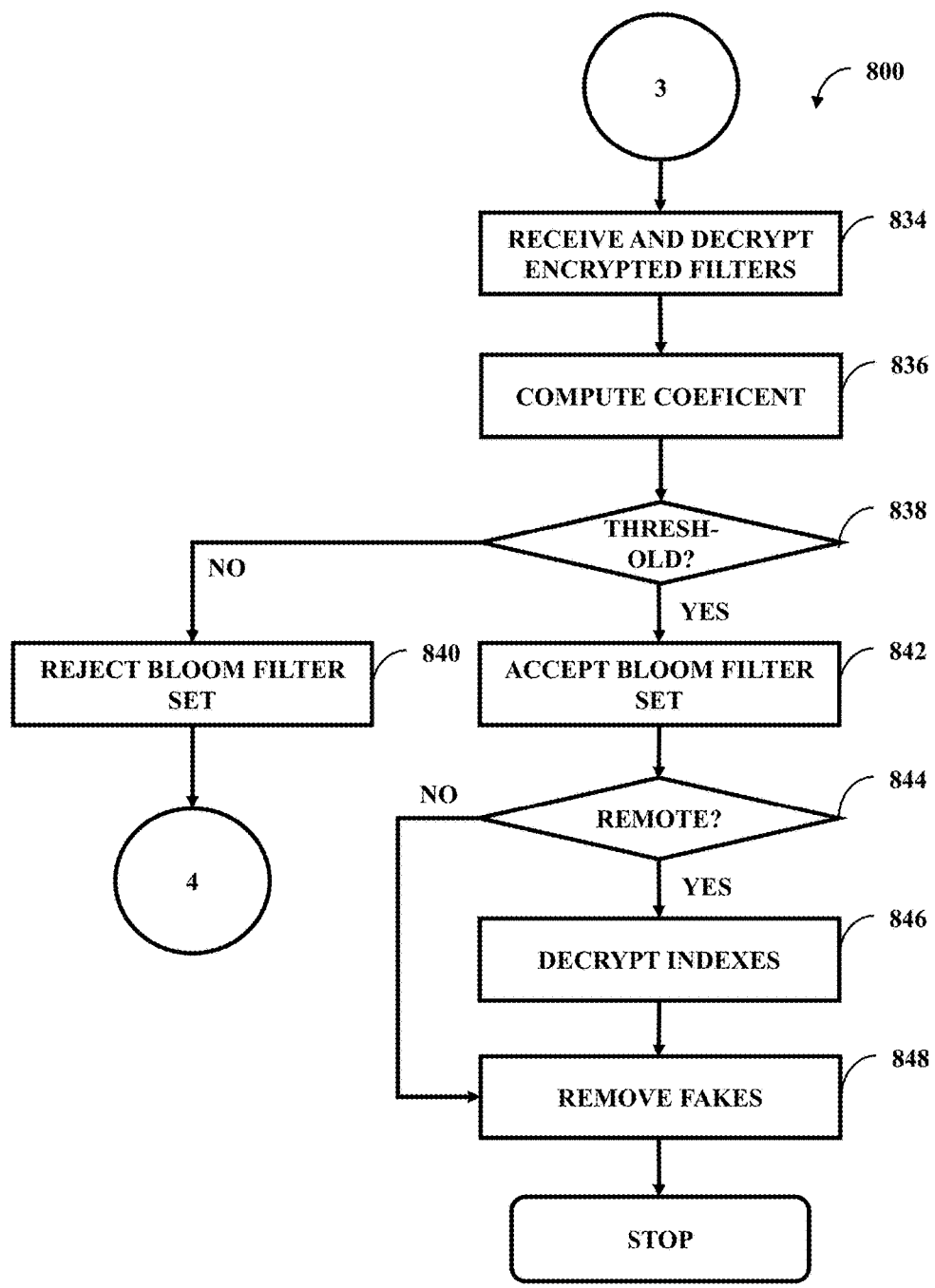

FIG. 7 illustrates one embodiment of a method 700 comprising five actions 710-750. The method 700 can function with regard to a Bloom filter set (one or more Bloom filters). The method 700 can, in one embodiment, be performed by the KH 610 and CD 620, both of FIG. 6, and function as the protocol. A site can send encrypted information (e.g., a character of the last name and any other code such as card number) in the form of unique bigrams to the CD 620 of FIG. 6. At 710, the CD 620 of FIG. 6 can receive the encrypted information and at 720, the CD 620 of FIG. 6 can apply the secure comparison protocol upon pairs of bigrams in the query and record. This produces a list of encrypted comparison results.

At 730, the CD 620 of FIG. 6 can add a random number of fake bigram comparisons that do not match any real bigrams (for example two underscores compared to any two letters). This does affect the real number of common bigrams, but prevents the KH 610 of FIG. 6 from knowing the original lengths of the individual fields (e.g., names) being compared. These cipher texts can be sent to the KH 610 of FIG. 6 sorted lexicographically. The CD 620 of FIG. 6 can also send the KH 610 of FIG. 6 the sum of the lengths of fields (e.g., last name, card number) being compared in order for the KH 610 of FIG. 6 to compute the Dice coefficient.

At 740, the KH 610 of FIG. 6 decrypts encrypted information values provided in the list by the CD 620 of FIG. 6 and computes the Dice coefficient based on the number of bigrams that matched. If the Dice coefficient is above a certain threshold then this is considered a match on the information (e.g. last name). Matching can result in a binary match/non-match value for fields that are being sent in the query. The KH 610 of FIG. 6 would have these plaintext binary values. A probabilistic score can then be computed based on individual comparison results using the Fellegi-Sunter (FS) model (e.g., if a field value is not available, it could be replaced by an obsolete value which will not match but the result of the probabilistic matching on all fields may still be able to match the record). The parameters of this model can be estimated using an EM algorithm. If the score is higher than a cutoff, then the query is considered a match;

otherwise it is considered a non-match. The KH 610 of FIG. 6 can send the final match/non-match result to the site that initiated the query.

At 750, when a user is confirmed, the site sends that user's encrypted information to the CD 620 of FIG. 6 for storage. The site can pre-compute the bigrams for the strings and the information field (e.g., date of birth, individual user's demographic information) variants before encryption. The end of the washout period for that participant can also be sent, and this value is not encrypted.

In order to guard against any potential attack on this protocol, the implementation of fake queries can be used when there is a partial work load on the KH 610 of FIG. 6. Since the KH 610 of FIG. 6 has the private key and calculates the DC, it has the biggest learning potential of the parties in the protocol. Some information from the queries are forwarded after processing from the CD 620 of FIG. 6 to the KH 610 of FIG. 6 so the CD 620 of FIG. 6 knows how much work load it has passed onto the KH 610 of FIG. 6.

At times, when the KH 610 of FIG. 6 is not processing too many queries, the CD 620 of FIG. 6 can send the KH 610 of FIG. 6 random queries to which the sites ignore the results. This mechanism breaks the assumption that each calculation the KH 610 of FIG. 6 is performing is related to demographic information of an individual wanting to participate in sending information and so makes any attack on the protocol more difficult because of the introduction of fake queries that the KH 610 of FIG. 6 cannot differentiate from real queries. The system is protected from being slow because the CD 620 of FIG. 6 knows the work load it has passed onto the KH 610 of FIG. 6 and in general, the KH 610 of FIG. 6 will not be bombarded with queries.

This can prevent the frequency attacks successfully and evaluates the Dice coefficient correctly. The CD 620 of FIG. 6 may only learn about the user who queried it. The KH 610 of FIG. 6 learns nothing from the protocol except the number of records held by the CD 620 of FIG. 6, and the sum of bigrams contained in the records being compared.

In order to decide if two lists of bigrams match or don't match, a component can calculate the value of the Dice coefficient between those two lists and compare it against a threshold that was determined most suitable based on experimentation. One can consider A as the first list of bigrams and B as the second list of bigrams. The lists contain unique bigrams. |X| represents the number of bigrams in list X. The Dice coefficient's formula is shown below as it is shown in Equation 14 above:

$$DC = \frac{2*|A \cap B|}{|A|+|B|} \quad (31)$$

The CD knows the values of |A|, |B|, and the KH 610 of FIG. 6 knows the value of |A|+|B| and they both know the threshold for DC. To decide if the two lists match, it can be determined if the Dice coefficient is above or under the threshold. Since |A|+|B| is known, and the threshold value of DC is also known, a component can calculate a threshold value for |A∩B|.

For a true match the following is true:

$$Threshold_{DC} \leq \frac{2*|A \cap B|}{|A|+|B|} \quad (32)$$

-continued $$|A \cap B| \geq \frac{Threshold_{DC}*(|A|+|B|)}{2} \quad (33)$$

The following can be assumed:

$$K = \frac{Threshold_{DC}*(|A|+|B|)}{2} \quad (34)$$

If |A|<K or |A|<K, it is impossible that |A∩B|>>K so KH 610 of FIG. 6 is not asked to perform any decryptions. The result is immediately a non-match.

The rule |A∩B|>>K can hold. If the remaining number of bigrams to compare cannot meet that threshold, processing of decryptions can stop because at best, if everything else matches, the threshold will not be reached.

The use of a single Bloom filter for storing identifiers using a Cryptographic Longterm Key (CLK) is a secure, flexible, efficient scheme. CLK is a method for building an anonymous linking code. The CLK includes a single Bloom filter in which q-gram sets of a several identifiers are stored. It allows one to approximate the q-gram similarity between two sets of identifier values. Since various bigrams (e.g., first names and surnames, but also numerical variables such as date of birth and additional identifiers like place of birth) are hashed with different hash functions to the same bit array, it becomes more difficult for an attacker to detect repetitive patterns, even in sets of Bloom filters. Therefore, the probability can be increased that the same pattern of positions in a Bloom filter could be set by different bigrams from different identifiers. In the basic model, fields are hashed into the equal-sized BFs using the same set of hash functions. The resulting filters are then integrated into a single BF by a union operation.

Attacking a single Bloom filter of the kind used for CLKs can further impede constraints satisfactory problem (CSP) attacks which defines a set of constraints on a variable. In a CSP attack, the variables and their domains can be determined by a frequency analysis of the identifiers from the list (e.g., document name/number, network user, medical patient, voter registration and other) and of the Bloom filter encodings. For example, failure can occur in attacking data structures such as CLKs with their CSP attack. Therefore, the use of the CLK approach can be a beneficial modification of Bloom filters to prevent attacks.

It should be noted that the success of a frequency attack can depend on the ratio of the number of hash functions used to the length of the Bloom filter k/l. The CLK however takes several identifiers instead of one identifier, and the individual identifiers can be hashed with a different cryptographic key k. Different keys and multiple identifiers can render a frequency attack extremely difficult.

If one of the data sources acquires the CLKs from the registry, the possibility of a dictionary attack emerges. This could be prevented if the registry simply rotates the incoming CLKs by a secret number of positions. The ability to link the CLKs is thereby preserved whereas the possibility of a dictionary attack by a data source perishes. Regarding efficiency in terms of processing time, the CLC can take a comparable time similar to the plaintext.

The design and application of the CLK can be modified in several respects to meet certain practical requirements. That is, it is more flexible than non-error tolerant anonymous linking codes (ALCs) that do not use a single Bloom filter for identities using CLKs in various regards.

First, the CLK allows for relative weighting of included identifiers. For example, if Surname is to be of greater relevance than First Name, one can simply use relatively more hash functions to store Surname in the CLK.

Second, the CLK allows for adding additional identifiers ex post. Suppose a registry is accumulating CLKs. After years, there are more and more collisions and it would be advantageous to add an identifier. This identifier could, in principle, be added to the CLKs without taking recourse to the original values of the identifiers already incorporated. There is no need to know the cryptographic keys whatsoever since individual identifiers are hashed using a different cryptographic key. When the counting variant of Bloom filters is used to set up the CLKs, there would be even the possibility of a removal of identifiers.

Third, the design of the CLK allows for meaningful comparisons even in the event that some CLKs merely contain additional identifiers. Suppose in some CLKs an indicator of vital status ("dead/alive") is added. Depending on the data quality of the other identifiers this disturbs the similarity approximation to some extent, but makes it not obsolete as could be the case with other ALCs.

Fourth, as discussed above, the security of the CLKs can be enhanced by raising k/l. On the other hand, lowering k/l will result in an improved record linking quality. The CLK hence allows for fine-balancing security and linking ability under the terms of a specific application.

Fifth, The CLK returns continuous similarity scores. This implies that the CLK allows for economizing on the costs of false linking classifications by adopting specific loss functions in different studies. Suppose the cost of a false positive classification is relatively high as compared to the cost of a false negative classification. By raising the threshold for classification (e.g., it takes a higher similarity to be classified as a link), false positive cases tend to be avoided. Lowering the threshold would work the other way around.

The encryption of the Bloom filters can provide both privacy for the represented set and security of Bloom filter operations making them more secured in both counts. In one embodiment, a public-key encrypted Bloom filter scheme can be used. The scheme can employ three building blocks to accomplish its goal: Bloom filters, Goldwasser-Micali encryption, and the method of Sander, Young and Yung for computing the AND function.

Bloom filters have been discussed above. Goldwasser-Micali (GM) encryption is a public-key, semantically-secure (IND-CPA), homomorphic encryption scheme. Its plaintext length is about 1 bit. That is, in GM bits are encrypted one at a time and GM uses quadratic residuosity to encode a bit. A quadratic residue $r \in Z_n$ is a number such that there exists a numbers:

$$s^2 = r \bmod n \tag{35}$$

A number that isn't a quadratic residue is called a quadratic non-residue. In GM, a 0 is encoded as a quadratic residue and a 1 is encoded as a quadratic non-residue. The public key is n; v where n=pq where p and q are large primes. v is a quadratic non-residue modulo p and a quadratic non-residue modulo q.

To encrypt a 0, a user can choose a random $r \in Z_n$ and a system can compute $r^2$ mod n. To encrypt a 1, a user can choose a random $r \in Z_n$ and the system can compute $vr^2$ mod n (a quadratic residue). To decrypt a value, the system can check if the value is a quadratic residue. Differentiating between a quadratic residue (0) and a quadratic non-residue (1) implies knowledge of the factorization of n.

The following three can be defined:

KeyGen(κ): Let κ be a security parameter. Given κ, the system can generate the private key sk{p, q} and the public key pk={n=pq, v}.

Encrypt(x, pk): Given plaintext x and public key pk, the system can produce ciphertext c.

Decrypt(c, sk): Given ciphertext c and private key sk, the system can produce plaintext x. This can be done because of the random r, and two ciphertexts with the same plaintext are not distinguishable without knowing the private key, which makes the scheme semantically secure in the IND-CPA setting.

In one example, E(x) can denote encryption of x under GM public key pk. Multiplying two ciphertexts, for example, E(x)·E(y), results in an encryption of the exclusive-or (XOR) denoted by ⊕:

$$E(x) \cdot E(y) = E(x \oplus y) \tag{36}$$

This follows from the definition of 1 and 0 as given earlier. This can produce at least three different cases:

$$E(0) \cdot E(0) = r_1^2 \cdot r_2^2 \bmod n = (r_1 \cdot r_2)^2 \bmod n = E(0) \tag{37}$$

$$E(0) \cdot E(1) = r_1^2 \cdot v \cdot r_2^2 \bmod n = v \cdot (r_1 \cdot r_2)^2 \bmod n = E(1) \tag{38}$$

$$E(1) \cdot E(1) = v \cdot r_1^2 \cdot v \cdot r_2^2 \bmod n = (v \cdot r_1 \cdot r_2)^2 \bmod n = E(0) \tag{39}$$

Encrypting a Bloom filter is done by encrypting each individual bit of the Bloom filter using the public key. Note that the resulting ciphertext is substantially larger than the plaintext Bloom filter. If we assume p and q to be 1024 bit prime numbers, n is 2048 bits in size. Because each bit of the Bloom filter is encrypted individually, the resulting ciphertext is 2048 times the size of the plaintext Bloom filter.

Using the Sander, Young and Young (SYY) technique, it is possible to do a single AND operation on two (single bit) ciphertexts. As discussed earlier, a number of logical XOR can be performed on the ciphertexts. A ciphertext E(x) can be expanded as follows: Expand(c, pk): First, the given ciphertext (a single bit) c=E(x) is expanded to the expanded ciphertext computing a using public key pk. This operation can be repeated u times $0 \le i < u$ making a vector of length u. A flip can occur, such as through use of a digital random coin $r_i \in \{0,1\}^u$ (i= . . . , u), so that the coin is flipped u times. Ciphertext $E(e_i) \to \sigma_i$ can be computed according to the random coin flipping and be set in accordance with:

$$\sigma_i \leftarrow E(e_i) \begin{cases} E(x) \cdot E(1) = E(x \oplus 1), & \text{if } r_i = 0 \\ E(0), & \text{if } r_i = 1 \end{cases} \tag{40}$$

If x=1 then x⊕1=0 and $e_i$=0, so $\sigma_i \in \{E(e_i)\}$. If x=0 then x⊕1=1 and $e_i$=1, so the result is randomly distributed: $\sigma_i \in \{E(0), E(1)\}$.

To compute the logical AND of two GM encrypted bits, the system can use the expanded ciphertext σ for E(x) and the expanded ciphertext ρ for E(y). The encrypted AND τ is computed by pairwise multiplication of the elements of σ and τ, thus:

$$\tau_i = \sigma_i \cdot \rho_i = E(e_i) \cdot E(d_i) = E(e_i \oplus d_i) \tag{41}$$

The encrypted elements of τ can be decrypted by the private key holder to determine the result of the AND function. This can provide at least two possible outcomes:

$$D(\tau) \leftarrow \begin{cases} D(\tau_i) \in \{0, 1\}, & \text{if } x \wedge y = 0 \\ D(\tau_i) \in \{0\}, & \text{if } x \wedge y = 1 \end{cases} \quad (42)$$

If decrypted bits are 0, then the result of the AND function is 1, otherwise the result is 0. There is a probability of $2^u$ that a false positive occurs, where $E(x \oplus y)=0$ is falsely decrypted as a 1.

In one embodiment, there can be two parties—the hub and the detector—and a semi-honest adversary. The hub generates a public key n; v and private-key p; q and constructs a Bloom filter bh containing elements to be detected by the detector. The size of the Bloom filter should be chosen so that it is large enough to accommodate the (likely larger) set of the detector.

The Bloom filter can be encrypted, $EB_h = E(b_h)$, by encrypting individual bits of the Bloom filter with the public key. The public key n; v and $EB_h$ are then sent to the detector. The detector constructs a Bloom filter $b_d$ with elements it has observed in some period of time, and encrypts it with the public key to obtain $EB_d$.

The detector then computes the AND of $EB_h$ and $EB_d$ by applying the SYY method to individual pairs of bits of the encrypted Bloom filters. This yields the combined Bloom filter $EB_c$, which contains the encrypted set intersection of $B_h$ and $B_d$. This is then sent to the hub.

The hub decrypts individual bits of $EB_c$ to obtain $b_c$. If all bits of $b_c$ are 0, the intersection of $b_h$ and $b_d$ is empty and no hit is registered. If $b_c$ is non-zero, elements of $b_h$ should be tested against $b_c$ to check which element(s) both Bloom filters have in common, and thus caused a hit.

This indicates that an honest (or semi-honest) verifier will have zero-knowledge, completeness, and soundness known as zero-knowledge proof (ZKP). A simple proof that a ciphertext has plaintext 0 is to present a root $s^2=r$. It can be verified by squaring s to show zero-knowledge, since it does not reveal the secret key p and q. Furthermore, if r is a quadratic non-residue, no such s exists. The following can be the Proof-QR(r):

Common input: r, n n=pq
Prover's secret input: p, q
The prover outputs s.
The verifier accepts, if $s^2=r$.

Nevertheless, this proof does not prove that a ciphertext has plaintext 1. If the prover claims that there is no root s, there is no way for the verifier to check it. In this case a zero-knowledge proof (ZKP) can be used that r is a quadratic residue. The proof is analogous to the general ZKP for graph isomorphism by Goldreich, Micali and Widgerson. A ZKP can be used for graph non-isomorphism. This proof can be adapted to quadratic residues and present a ZKP that r is a quadratic non-residue. The following can be the proof Proof-QNR (r):

Common input: r, n n=pq
Prover's secret input: p, q
The verifier uniformly chooses a random number s and a bit b∈{0,1}. If b=0, then the verifier sends $rs^2$ to the prover. If b=1, then the verifier sends $rs^2$ to the prover.
The prover outputs a guess b' of b. The prover also sends a guess s' of s.
The verifier accepts if b'=b and s'=s.

For a ZKP, a simulator can be used to prove three properties: (honest-verifier) zero-knowledge, completeness and soundness. Zero-knowledge can mean that the verifier learns nothing about the secret input of the prover. This can be determined by the verifier's view from input (e.g., including random coin tosses) and output (e.g., of a successful proof). In this case, the simulator can be particularly simple, since it can mirror the verifier's random choices b and s.

Completeness can mean that if r is indeed a quadratic non-residue, an honest verifier, in one embodiment, will always accept. Clearly, if r is a quadratic non-residue then $rs^2$ is a quadratic non-residue, but $s^2$ is always a quadratic residue. Therefore the prover can distinguish the choice b by computing quadratic residuosity.

Soundness can mean that if r is not a quadratic non-residue—that is, $t^2=r$—then an honest verifier will reject with high probability. If b=1 and $t^2=r$, then s'=st, such that $s'^2=rs^2$. The message from the verifier is therefore indistinguishable from the prover for both cases of b. The probability of a right guess b' is then at most ½. In order to increase the probability for rejecting the ZKP in case of a quadratic residue, the above ZKP can be repeated n times in parallel. The probability of a false accept is then $2^{-n}$.

In one embodiment, a public-key encrypted Bloom filter can be employed. The privacy-preserving, publicly verifiable Bloom filter that uses public-key encryption can be called a public-key encrypted Bloom filter (PEBF). The PEBF can be used to encrypt individual bits $b_j$ of the Bloom filter using GM encryption. The following operations can be performed with regard to a PEBF: Create(m, κ), Add(x), Test(x) (e.g., Test(x)$_{true}$, and Test(x)$_{false}$), and Compare(E (b')).

Create(m, κ) can begin with creation of a public-, private-key pair in the GM encryption scheme using KeyGen(κ) with the logic:

pk,sk←KeyGen(K)

This can follow with creation of a Bloom filter with the logic:

$b_j, h_i$←Create(m)

The Bloom filter can be encrypted, such as bit by bit, with the logic:

$E(b_j)$←Encrypt($b_j$,pk)

In one embodiment, E(b) denotes the element-wise encryption of b=( . . . , $b_j$, . . . ) with the public key pk. The public part of the PEBF is E(b); $h_i$; pk while the private part is the secret key sk. It is shown that the PEBF does not leak information about the content of the Bloom filter.

Add(x) can begin by computing indices of Bloom filter for addition with the logic:

$l_i$←$h_i$(x)

Individual bits of the Bloom filter can be recomputed by replacing a bit with a plaintext 1 if it is set by the Add(x) operation and re-randomizing if it is not set by the command:

$$E(b_j) = \begin{cases} E(0), & \text{if } \exists \, i \cdot j = l_i \\ E(b_j) \cdot E(0) = E(b_j \oplus 0), & \text{otherwise} \end{cases}$$

It is assured that the public part of the PEBF before and after an addition does not leak information about the added item.

Test(x)$_{true}$, that is part of Test(x), can include checking whether a PEBF contains an element x and if there is a requirement of the private key sk. Construction of a ZKP PEBF Test(x)$_t$, that x is contained within the public PEBF part E(b), $h_i$, pk can occur. This ZKP PEBF can include a common input of x, E(b), $h_i$, pk and a prover's secret input.

of sk. Test(x)$_{true}$ can begin with computing the set Bloom filter indices for x with the logic:

$l_i \leftarrow h_i(x)$

The ciphertext for individually set Bloom filter bits can be expanded by way of the logic:

$\sigma_{l_i} \leftarrow \text{Expand}(E(b_{l_i})), pk$

Computation of AND can occur of set Bloom filter bits using the homomorphism through the logic:

$\sigma \leftarrow (\sigma_{l_1}, \ldots, \sigma_{l_k})$

This establishes that $\sigma_j$ ($0 \le j < u$) is a quadratic residue QR($\sigma_j$). So, it is proved that the honest receiver/verifier has the zero-knowledge, that is, the receiver is ZKP.

When Test(x)=true, then Test(x)$_{true}$ is accepted by an honest verifier/receiver. With Test(x)$_{true}$, $E(b_{l_i})$ is a quadratic non-residue, $\sigma_{l_i,j}$ is a quadratic residue, and consequently the $\sigma_j$(s) are quadratic residues. For soundness it is shown that when test(x)=false, then Test(x)$_{true}$ will be rejected by an honest verifier/receiver with high probability. If Test(x) =false, then there exists an index i ($0 \le i < k$), such that $l_i = h_i(x)$ and $b_{l_i} = 0$. Then $\sigma_{l_i,j}$ is (uniformly) randomly distributed in $\{E(0), E(1)\}$ and so is $\sigma_j$. Then at least one ZKP for quadratic residuosity will fail with probability $(1 - 2^{-u})$.

Test(x)$_{false}$, that is part of Test(x), can be used to prove that an element x is not contained in a PEBF. To do this, a proof can be done that at least one index of a has a quadratic non-residue. Unfortunately, knowing that $\sigma_1$ is a quadratic non-residue may imply that (one specific) $b_j = 0$. In one embodiment, there can be random choices in the Expand( ) operation and can be such that the ciphertext of only one $E(b_j)$ is used and the others are fixed to $E(0)$.

In view of this, a more complicated ZKP PEBF: Test(x)$_{false}$ can be constructed. This can be a repeat of the beginning of Test(x)$_{true}$, with computing the set Bloom filter indices for x, $l_i \leftarrow h_i(x)$ expanding the ciphertext for individually set Bloom filter bits, $\sigma_{l_i} \leftarrow \text{Expand}(E(b_{l_i})), pk$ and Computation of AND can occur to facilitate setting of Bloom filter bits using the homomorphism.

$\sigma \leftarrow (\sigma_{l_1}, \ldots, \sigma_{l_k})$

A choice can be made of a random permutation $\pi$ of (1, idot s, u) and a u-length vector of ciphertexts $\rho = (E(0), \ldots)$ through the logic (e.g., computation):

$\tau \leftarrow (\sigma) \cdot \rho$

A proof can be made in zero-knowledge that $\tau$ is a shuffle of a by way of the logic:

Proof-Suffle($\sigma, \tau$)

This can reveal an index i, such that $\tau_i$ is a quadratic non-residue and prove it in zero-knowledge by way of the logic:

Proof-$QNR(\tau_i)$

The zero-knowledge proof PEBF Test(x)$_{false}$ is honest-verifier/receiver zero-knowledge, complete, and sound. The proof for the properties of completeness and soundness are analogous to the proof for PEBF Test(x)$_{true}$. For honest-verifier zero-knowledge, a system can be used that uniformly chooses a random i. For $\tau_i$, the system can choose a random permutation of the ciphertexts a except for $\tau_i$ (e.g., choose one with plaintext 1 (a quadratic non-residue)). In one embodiment, a quadratic residue at index i can occur. The system can invoke Proof-Suffle($\sigma, \tau$). If the system cannot handle the quadratic residue, such as determined through a system test, then a rewind can occur and the system can choose a new i. The choice of i can fall on a quadratic non-residue with probability ½. Therefore there can be a high probability of success. Along with this Proof-$QNR(\tau_i)$ can be invoked.

For Compare(E(b')), (E(b')) can be the encrypted Bloom filter content for the same hash functions $h_i$. Using the secret key sk, a system can construct a ZKP PEBF Compare. This can have a common input: E(b'), E(b), pk with the prover's secret input: sk.

Compare(E(b')) can begin by computing the negated, logical XOR of the two encrypted Bloom filter contents using the homomorphism of the encryption scheme with the logic:

$E(b'') \leftarrow E(b) \leftarrow E(b') \cdot E(b') \cdot E(1_m) = E(b \oplus b' \oplus 1^m)$ Then, expanding the ciphertext for each Bloom filter bit ($0 \le i < m$) can occur by way of the logic:

$\sigma_i \leftarrow \text{Expand}(E(b''_i), pk)$

Compare(E(b')) can also include computing the logical AND of Bloom filter bits using the homomorphism with the logic:

$\sigma \leftarrow \sigma_0, \ldots, \sigma_{m-1}$

Proof in zero-knowledge that $\sigma_j$ ($0 \le j < u$) is a quadratic residue by way of the logic:

Proof-$QR(\sigma_j)$

The zero-knowledge proof PEBF Compare is honest-verifier/receiver zero-knowledge, complete and sound. The proof for honest-verifier zero-knowledge is equal to the proof for honest-verifier zero-knowledge for PEBF Test(x)$_{true}$. PEBF Compare can be accepted by an honest verifier. If b=b', then b''=$1^m$ and $\sigma$ are quadratic residues. If b=b', then PEBF Compare can be rejected by an honest verifier with high probability. If b≠b', then b'' contains a 0 and $\sigma$ contains a quadratic non-residue with probability $(1 - 2^{-u})$. Consequently, at least one ZKP Proof-QR($\sigma_j$) can be rejected with high probability. The construction of a ZKP that b≠b' follows the same ideas as ZKP PEBFTest (X)$_{false}$.

The public-key encrypted Bloom filter encrypts the content of the Bloom filter using public-key, homomorphic encryption. In one embodiment, only the private-key holder can access the Bloom filter content. It enables the public-key holder to non-interactively add elements by encrypting them. Furthermore, it has been verified with zero-knowledge proofs for non-interactively verifying the inclusion or exclusion of an element and the equality of two Bloom filter contents.

To Protect Bloom filters, one can perform several privacy-preserving supply chain integrity checks. One check can be checking a path of an item through a supply chain against black lists, against white lists, or for equality. The public-key encryption protects the confidentiality of the Bloom filter content during all these operations.

FIGS. 8A-8D illustrate one embodiment of a method 800 (four figures showing different parts of the method 800). At 802, a determination can be made on object keys to be inserted into a Bloom filter. At 804, a check can occur on if any of the object keys are too long, if so then they can be compressed and/or shortened (e.g., through hashing using a probabilistic algorithm) at 806. When the object keys are of sufficient length, be it from the action 806 or the check 804 resulting that they are of sufficient length, then another check can occur at 808 to determine if a remote search application is applicable. If so, then at 810 secure indexing can be created. After this is done or if there is no applicable remote search application, then at 812 q-grams can be chosen.

At 814, secure random salt can be dynamically created. At 816, a number of independent hash functions can occur (e.g., through optimization). Additionally, at 816, a size of the Bloom filter to meet Bit-Error-Rate/False Positive Rate metrics can be chosen. At 818, multiple strong independent hash functions can be created from the chosen independent hash functions (e.g., by way of sample-tabulation hashing, twisted-tabulation hashing, or double-tabulation hashing). At 820, random bits can be inserted into the Bloom filter and at 822 fake bits (e.g., noise) can be inserted into the Bloom filter.

At 824, a linkage can be created for the Bloom filter (e.g., record/profile level linkage). The Bloom filter can be created with identifiers using long term clocks, at 826, and for q-grams, at 828. At 830, the Bloom filter can be encrypted (e.g., along with being divided into sets). The Bloom filter can be transmitted at 832, such as a series of sets. Actions 802-832 can be performed, in one embodiment, by the client 410 of FIG. 4A.

At 834, an encrypted Bloom filter can be received, decrypted, and have the sets put together. At 836, a similarity coefficient can be calculated and, at 838, a check can occur to determine if the coefficient meets a threshold. If the coefficient does not meet the threshold, then the Bloom filter can be rejected at 840. A message can be sent to the client 410 of FIG. 4A (and the client can try again to produce a more acceptable Bloom filter). If the coefficient does meet the threshold, then the Bloom filter can be accepted at 842. At 844, a check can determine if the remote search application is applicable. The result of this (e.g., tied to the result of 808) can determine if indexes are decrypted at 846 before continuing to 848 or if the method goes from 844 to 848. At 848, fake information can be removed. Actions 834-848 can be performed, in one embodiment, by the search engine 420 of FIG. 4A.

While the methods disclosed herein are shown and described as a series of blocks, it is to be appreciated by one of ordinary skill in the art that the methods are not restricted by the order of the blocks, as some blocks can take place in different orders. Similarly, a block can operate concurrently with at least one other block. Individual blocks of the methods, in one example, can function as an algorithm or multiple sub-algorithms.

Figure 9:
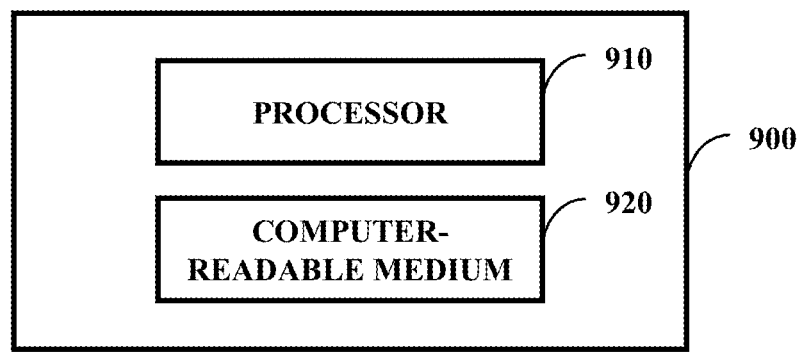
FIG. 9 illustrates one embodiment of a system comprising a processor and a computer-readable medium.

FIG. 9 illustrates one embodiment of a system 900 comprising a processor 910 (e.g., a general purpose processor or a processor specifically designed for performing functionality disclosed herein) and a computer-readable medium 920 (e.g., non-transitory computer-readable medium). In one embodiment, the computer-readable medium 920 is communicatively coupled to the processor 910 and stores a command set executable by the processor 910 to facilitate operation of at least one component disclosed herein (e.g., the cluster component 350 of FIG. 3B). In one embodiment, at least one component disclosed herein (e.g., the encryption component of FIG. 3B) can be implemented, at least in part, by way of non-software, such as implemented as hardware by way of the system 900. In one embodiment, the computer-readable medium 920 is configured to store processor-executable instructions that when executed by the processor 910 cause the processor 910 to perform a method disclosed herein, such as the method 800 discussed above.

The secure generalized Bloom filter proposed herein can be used in a wide variation of tactical and commercial communications environments as well as for the applications that run over those networks, not to be limited, as follows: Centralized Applications with Client-Server (C/S) Architecture, Distributed Applications with Peer-to-Peer (P2P) Architecture, Catching, Fixed Networks, Cellular Wireless Networks, and/or Mobile Ad Hoc Networks.

What is claimed is:

1. A non-transitory computer-readable medium configured to store computer-executable instructions that when executed by a processor cause the processor to perform a method, the method comprising:
   identifying a request to create a secure Bloom filter; and
   creating the secure Bloom filter through implementation of a security method, the security method comprising:
      compressing an identifier of a Bloom filter;
      creating secure indexing of the Bloom filter based on the compressed identifier;
      creating random salt dynamically for the Bloom filter;
      creating multiple independent hash functions for the Bloom filter;
      inserting a random bit into the Bloom filter;
      inserting a fake bit into the Bloom filter;
      creating a linkage for the Bloom filter;
      integrating the Bloom filter with multiple identifiers using a long-term clock; and
      encrypting the Bloom filter using the random salt and at least one of the multiple independent hash functions.

2. The non-transitory computer-readable medium of claim 1,
   where the multiple independent hash functions comprise a simple tabulation hashing.

3. The non-transitory computer-readable medium of claim 1,
   where the multiple independent hash functions comprise a twisted tabulation hashing.

4. The non-transitory computer-readable medium of claim 1,
   where the multiple independent hash functions comprise a double tabulation hashing.

5. The non-transitory computer-readable medium of claim 1,
   where the fake bit is a fake noise bit.

6. The non-transitory computer-readable medium of claim 1,
   where the fake bit is a fake phonetic code bit.

7. The non-transitory computer-readable medium of claim 1, the method comprising:
   causing an output of the secure Bloom filter.

8. A method that creates a secure Bloom filter, the method comprising:
   compressing an identifier of a Bloom filter;
   creating secure indexing of the Bloom filter based on the compressed identifier;
   creating random salt dynamically for the Bloom filter;
   creating multiple independent hash functions for the Bloom filter;
   inserting a random bit into the Bloom filter;
   inserting a fake bit into the Bloom filter;
   creating a linkage for the Bloom filter;
   integrating the Bloom filter with multiple identifiers using a long-term clock; and encrypting the Bloom filter using the random salt and at least one of the multiple independent hash functions.

9. The method of claim 8, where the multiple independent hash functions comprise a simple tabulation hashing.

10. The method of claim 8, where the multiple independent hash functions comprise a twisted tabulation hashing.

11. The method of claim 8, where the multiple independent hash functions comprise a double tabulation hashing.

12. The method of claim 8, where the fake bit is a fake noise bit.

13. The method of claim 8, where the fake bit is a fake phonetic code bit.

14. A system comprising a hardware processor configured to execute an instruction set comprising:
   compressing an identifier of a Bloom filter;
   creating secure indexing of the Bloom filter based on the compressed identifier;
   creating random salt dynamically for the Bloom filter;
   creating multiple independent hash functions for the Bloom filter;
   inserting a random bit into the Bloom filter;
   inserting a fake bit into the Bloom filter;
   creating a linkage for the Bloom filter;
   integrating the Bloom filter with multiple identifiers using a long-term clock; and
   encrypting the Bloom filter using the random salt and at least one of the multiple independent hash functions.

15. The system of claim 14, where the multiple independent hash functions comprise a simple tabulation hashing.

16. The system of claim 14, where the multiple independent hash functions comprise a twisted tabulation hashing.

17. The system of claim 14, where the multiple independent hash functions comprise a double tabulation hashing.

18. The system of claim 14, where the fake bit is a fake noise bit.

19. The system of claim 14, where the fake bit is a fake phonetic code bit.

20. The system of claim 14, where the encrypted Bloom filter is outputted as a secure Bloom filter.

* * * * *